United States Patent [19]

Goldrich

[11] Patent Number: 5,116,173

[45] Date of Patent: May 26, 1992

[54] METHOD OF GENERATING BEVEL AND HYPOID GEARS

[75] Inventor: Robert N. Goldrich, Rochester, N.Y.

[73] Assignee: The Gleason Works, Rochester, N.Y.

[21] Appl. No.: 661,775

[22] Filed: Feb. 26, 1991

[51] Int. Cl.⁵ .............................................. B23F 9/14
[52] U.S. Cl. ....................................... 409/13; 51/287; 409/26
[58] Field of Search ............... 409/26, 27, 28, 29, 409/33, 15, 13, 30, 43; 51/52 R, 287, 95 G H, 105 G H

[56] References Cited

U.S. PATENT DOCUMENTS

| | | | |
|---|---|---|---|
| 1,622,555 | 3/1927 | Wildhaber | 409/26 |
| 1,654,199 | 12/1927 | Wildhaber | 409/53 |
| 1,676,371 | 7/1928 | Wildhaber | 409/26 |
| 1,685,442 | 9/1928 | Wildhaber et al. | 409/26 |
| 1,980,365 | 11/1934 | Wildhaber | 409/26 |
| 1,982,036 | 11/1934 | Wildhaber | 409/26 |
| 2,310,484 | 2/1943 | Wildhaber | 409/26 |
| 2,773,429 | 12/1956 | Wildhaber | 409/13 |
| 2,824,498 | 2/1958 | Baxter, Jr. et al. | 409/26 |
| 4,467,568 | 8/1984 | Bloch et al. | 51/287 |
| 4,930,950 | 6/1990 | Stadtfeld | 409/27 |
| 4,954,027 | 9/1990 | Faulstich | 51/287 X |
| 4,981,402 | 1/1991 | Krenzer et al. | 409/26 |
| 5,000,632 | 3/1991 | Stadtfeld | 409/26 |
| 5,014,467 | 5/1991 | Luhmer | 51/287 |
| 5,044,127 | 9/1991 | Ryan | 51/287 |

FOREIGN PATENT DOCUMENTS

| | | | |
|---|---|---|---|
| 46311 | 2/1982 | European Pat. Off. | 409/43 |
| 255297 | 3/1988 | Fed. Rep. of Germany | 409/13 |
| 261537 | 11/1988 | Fed. Rep. of Germany | 409/27 |
| 152320 | 7/1986 | Japan | 409/27 |
| 751533 | 7/1980 | U.S.S.R. | 409/13 |
| 1407708 | 7/1988 | U.S.S.R. | 409/30 |
| 8707551 | 12/1987 | World Int. Prop. O. | 51/52 R |

OTHER PUBLICATIONS

Wildhaber, "Basic Relationship of HYPOID GEARS," American Machinist, McGraw-Hill, 1946.
Baxter, "An Application of Kinematics and Vector Analysis to the Design of a Bevel-Gear Grinder," American Society of Mechanical Engineers, 1964.

*Primary Examiner*—William Briggs
*Attorney, Agent, or Firm*—Ralph E. Harper; Robert L. McDowell

[57] ABSTRACT

A method is disclosed wherein standard generating motions for the production of bevel and hypoid gears are modified by the substantially simultaneous inclusion of additional controlled motions which enable a desired tooth surface geometry to be produced on the gears. The additional motions comprise varying the position of intersection of the theoretical generating gear axis and the pitch plane and/or varying the orientation of the tooth surfaces of the theoretical generating gear with respect to the body of the theoretical generating gear. A CNC machine is preferably utilized for carrying out the inventive process. The inventive process is applicable to generating processes of both the face milling and face hobbing type.

43 Claims, 24 Drawing Sheets

METHOD OF GENERATING BEVEL AND HYPOID GEARS

FIELD OF THE INVENTION

The invention relates to a method of generating tooth surfaces of bevel and hypoid gears in the field of bevel and hypoid gear manufacture. According to the method, tooth surfaces of a work gear are generated by a tool's working surfaces together with its relative motions with respect to the work gear.

BACKGROUND OF THE INVENTION

Known methods for generating tooth surfaces in bevel and hypoid gears are based on a concept of a tool together with its relative motions with respect to a work gear representing a "theoretical generating gear" rolling through mesh with the work gear. Working surfaces of the tool represent tooth surfaces of the theoretical generating gear, and known bevel and hypoid gear generating machines provide for positioning the tool and the work gear with respect to a machine axis (e.g., machine cradle axis) representing an axis of the theoretical generating gear. The working surfaces of the tool are rotated about the machine axis in a timed relationship with rotation of the work gear about its axis as though the working surfaces of the tool were the actual surfaces of another gear rotating through mesh with the work gear.

Most explanations of bevel and hypoid gear generation recount a principle that if tooth surfaces of the members of a bevel or hypoid gear pair are separately generated by rolling the respective members in mesh with "complementary" theoretical generating gears, tooth surfaces of the respective members will be generated conjugate to each other (i.e., fully mesh with each other). In accordance with this principle, complementary theoretical generating gears are understood to share the same axis and tooth surfaces, opposite sides of which constitute the respective tooth surfaces of the complementary gears.

Although most explanations of bevel and hypoid gear generation emphasize only the condition of complementarity, it is also known that complementarity alone is not a sufficient condition for generating conjugate tooth surfaces in mating gears. That is, the condition of complementarity must be combined with other conditions defining the theoretical generating gears as so-called "basic members." Two conditions must be fulfilled for a theoretical generating gear to meet the requirements of a basic member. First, relative angular velocity between the theoretical generating gear and either member of a conjugate gear pair must define an instant axis of rotation coincident with an instant axis of rotation defined by relative rotation of the conjugate gear pair. Second, relative linear velocity of points along the instant axis between the theoretical generating gear and either member of the conjugate gear pair must be in a ratio with the magnitude of the relative angular velocity matching a similar ratio of linear and angular velocity between the conjugate gear pair. In other words, the theoretical generating gear together with either member of a conjugate work gear pair must define the same "lead" (i.e., axial advance per radian of turning about the instant axis) as the conjugate gear pair. A more detailed explanation of basic members is found in U.S. Pat. No. 1,676,371 to Wildhaber.

In the case of a conjugate bevel gear pair, the magnitude of relative linear velocity along the instant axis between the gear pair is zero. Accordingly, it is possible to define a basic member of the pair as another bevel gear. Most explanations of bevel and hypoid gear generation depict tools arranged to represent complementary theoretical generating gears in the form of complementary crown gears (i.e., bevel gears having planer pitch surfaces perpendicular to their respective axes of rotation).

However, a basic member of a conjugate hypoid gear pair (other than one member or the other of the pair) is neither a bevel gear nor another hypoid gear. Hypoid gear pairs include axes which are offset with respect to each other resulting in a measure of relative linear velocity along the instant axis of the pair. Any basic member other than one or the other members of the gear pair must include a supplemental component of linear velocity in addition to the linear and angular velocities resulting from rotation about its axis. Typically, the basic member of a hypoid gear pair is considered as a helicoidal segment which includes a translating motion along its axis timed with rotation about its axis.

However, many bevel and hypoid gear pairs are understood to be manufactured according to a process in which the basic member is defined as being one of the members of the work gear pair. For example, according to U.S. Pat. No. 1,622,555 to Wildhaber, tooth surfaces of the larger member of the pair (usually a ring gear) are formed by the working surfaces of a tool without any generating motion between the tool and work gear. In other words, tooth surfaces of the ring gear member of the pair are formed as complementary surfaces of the tool. Tooth surfaces of the other member of the work gear pair (usually a pinion) are generated by a second tool arranged to represent the ring gear member. Thus, the working surfaces of the tool for generating the pinion tooth surfaces represent the actual tooth surfaces of the ring gear as a basic member of the work gear pair.

In practice, however, most tools used to generate mating gear pairs represent tooth surfaces of theoretical generating gears that depart slightly from complementarity. Some of this departure is desirable for producing a controlled amount of mismatch between otherwise conjugate mating members. Mismatch between mating tooth surfaces is provided to accommodate tooth distortions under expected loads and to permit some adjustability of the mounting locations of the gear members. However, other types of departure from complementarity are generally undesirable. For example, tooling limitations often preclude an exact representation of the desired tooth surfaces of theoretical generating gears.

Two main types of tooling are known for generating tooth surfaces in bevel and hypoid gears, namely, face milling tools and face hobbing tools. Face milling types of tooling have inherent characteristics which make representations of fully complementary tooth surfaces difficult. Face hobbing types of tooling may be easily arranged to represent complementary tooth surfaces but encounter problems in representing tooth surfaces which depart from complementarity for producing desirable mismatch between mating work gear tooth surfaces.

The two tooling types are associated with different machine operations. For example, face milling tools are used in intermittent indexing operations in which each tooth space in a work gear is separately generated. The work gear is indexed a predetermined amount about its axis between generating operations so that the generated tooth spaces are evenly distributed about the periphery of the work gear. In contrast, face hobbing tools are used in continuous indexing operations in which all of the tooth spaces in a work gear are formed by a single continuous generating motion. Continuous indexing operations require the tool and work gear to be rotated about their respective axes in a ratio of rotational speeds which enables different portions of the tool to engage successive tooth spaces in the work gear. The continuous indexing operation is performed at a much higher rate than the generating operation so that substantially the same tooth surfaces are generated in each tooth space.

Of the two types of tooling mentioned above, face milling tools have been by far the most common type of tooling by which bevel and hypoid gear tooth surfaces have been generated. Three main reasons may be supposed for this. First, intermittent indexing operations may be performed on a less complex machine than continuous indexing operations. Second, face milling tools are less complex and easier to manufacture and assemble than face hobbing tools. Third, tools having a similar shape to face milling tools (e.g., cup-shaped grinding wheels) may be used to finish grind tooth surfaces, whereas no corresponding form of face hobbing tool for finish grinding tooth surfaces has been commercially successful.

Face milling tools include a plurality of blades projecting from a front face of a cutter head which are arranged in one or more concentric circles about an axis of rotation of the cutter head. Typically, a set of "inside" blades for working convex flanks of work gear teeth are arranged at a first radius from the cutter head axis, and a set of "outside" blades for working concave flanks within the same tooth space are arranged at a second larger radius. The respective blades include cutting edges which are inclined at respective pressure angles to the axis of the cutter head. Rotation of the respective cutting edges about the axis of the cutter head defines respective working surfaces of the tool substantially in the form of conical surfaces of revolution.

However, such surfaces of revolution are not well suited to exactly representing complementary tooth surfaces of theoretical generating gears. By way of example, a pair of identical face milling tools may be considered to represent respective tooth surfaces of a pair of bevel crown gears. Although identical teeth may be represented in the crown gears, the condition of complementarity requires that the teeth of one member of a complementary pair exactly match the tooth spaces of the other member. In other words, the concave tooth flanks of the one member must match the convex tooth flanks of the other member and visa versa. However, in the identical cutter heads, the concave tooth flanks of both members are formed by outside blades at a larger radius than the radius of the inside blades for forming the convex tooth flanks of the same members. Thus, the longitudinal tooth curvatures of the mating concave and convex flanks of the crown gear pair represented by the identical face milling tools may be understood to depart from complementarity.

A second type of departure from complementarity relates to the working surfaces of opposite tooth flanks being arranged as concentric surfaces of revolution in the face milling tools. The concentric working surfaces of each of the identical tools define substantially parallel longitudinal tooth curves in each of the respective crown gears. However, longitudinal tooth curves of the respective flanks of tooth spaces in the crown gears depart from parallel by the angular spacing between gear teeth. Thus, the longitudinal tooth curves of the mating concave and convex flanks of the crown gear pair also depart from complementarity in angular orientation (i.e., spiral angle).

Of course, the just-explained characteristics of face milling tools have been long known, and methods to work with these characteristics have been developed in the art. For example, it has been known to match the longitudinal tooth curves formed in one member of a gear pair by using separate cutter heads having only inside or outside blades for working opposite tooth flanks in the mating gear member. It is also known from U.S. Pat. No. 1,676,371 to Wildhaber to rearrange the inside and outside blades of a complementary cutter head (referred to as a "straddle" cutter head) to work opposite flanks of the same work gear tooth instead of the opposite flanks of a tooth space. Other known methods relate to finding angular orientations between the axes of respective face milling tools to appropriately match longitudinal tooth curvatures as well as spiral angles at a mean point of contact between theoretical generating gears. For example, it is known from U.S. Pat. No. 1,654,199 to Wildhaber to relatively incline the tool axes about a longitudinal tangent line at a mean point of the respective tooth curves to appropriately match longitudinal curvatures between theoretical generating gears. It is also known to relatively incline the tool axes in directions which produce tapering width and depth teeth to appropriately match the spiral angles of theoretical generating gear tooth flanks at the selected mean points. The latter mentioned tool axes inclinations are almost universally practiced with face milling tools to provide for balancing tooth shape between mating work gear members.

Although the known methods to deal with the problems of longitudinal tooth curvature and spiral angle may be used to appropriately match theoretical generating gear tooth surfaces in the vicinity of a mean point between the surfaces, the represented tooth surfaces tend to depart from complementarity with increasing distance from the mean point at which the surfaces are matched. Often, these departures are not consistent with a desired mismatch between the mating work gear members. Accordingly, the art also includes a number of solutions for minimizing the residual effects of the solutions for at least approximately matching longitudinal curvatures and spiral angles of theoretical generating gear teeth.

Typically, these residual effects are measured by resulting contact characteristics between the mating work gears. In other words, once the gross shapes of the mating work gear tooth surfaces have been determined, further details of the tooth shapes are not so important as contact characteristics between the members which result from the difference or mismatch between the mating tooth surfaces. Thus, the residual effects of the corrections for tooth curvature and orientation are often related in terms of contact characteristics such as "bias bearing" (a contact pattern extending diagonally of mating tooth surfaces), "lame bearing" (a contact pattern higher on the tooth profile of one flank than the other), and "cross bearing" (contact patterns shifted to opposite ends of the tooth flanks).

Although face hobbing tools may be easily arranged to represent complementary generating gears, the same types of residual effects often occur as a result of modifications to the face hobbing tooling for producing desirable mismatch between mating gear members. Most known solutions for minimizing undesirable residual effects on tooth contact characteristics arising from the use of either face milling or face hobbing tooling relate to changing the respective definitions of the theoretical generating gears for producing mating gear members. In other words, the theoretical generating gears for generating tooth spaces in mating members of a work gear pair are defined in ways which depart from the requirements of substantially complementary basic members.

Accordingly, it may be understood that the known practices of generating bevel and hypoid gears, often deviate from the conventional explanation of bevel and hypoid gear generation. Once the tooth surfaces of a work gear member are defined, the tooth surfaces of that member may be generated by a tool arranged to represent any conjugate mating member. In other words, as long as respective theoretical generating gears define tooth surfaces which are conjugate to the desired tooth surfaces of the members of a work gear pair, it is not necessary for the theoretical generating gears to be complementary basic members or even conjugate to each other.

For example, U.S. Pat. No. 1,685,442 to Wildhaber discloses a method of eliminating the residual condition of "bias bearing" resulting from tool axis inclinations for producing tapering width and depth teeth. According to the known method, tooth flanks of a ring gear member of a work gear pair are generated in a customary manner conjugate to a nominal crown gear, and opposite flanks of the pinion member are separately generated by theoretical generating gears in the form of crown gears that are offset with respect to both the nominal crown gear and each other. The theoretical generating gears are also rotated together with the pinion member at different ratios of rotational speeds (i.e., different rates of generating roll). This is referred to as "modified roll".

U.S. Pat. No. 1,982,036 to Wildhaber extends the just-above described method to the more common practice of generating only one member (e.g., pinion) of a pair substantially conjugate to the non-generated tooth surfaces of the other member (e.g., ring gear) of the pair. Respective tooth surfaces of the pinion member are generated conjugate to theoretical generating gears which differ from the ring gear member to compensate for tooling limitations which preclude an exact representation of tooth surfaces of the ring gear member.

In addition to defining different locations and rotational speeds between theoretical generating gears for generating the respective members of a work gear pair, it is also known to define different motions along the respective axes of the theoretical generating gears. For example, U.S. Pat. No. 1,980,365 to Wildhaber discloses use of a translating motion of a theoretical generating gear along its axis timed with its rotation. This motion is also known as "helical motion". The translating motion defines one of the theoretical generating gears as a helicoidal segment, which is the basic generating member of a hypoid gear set, for simultaneously eliminating the "bias bearing" condition on both flanks of a gear member using the same ratio of generating roll.

Other motions affecting the generation of bevel and hypoid tooth surfaces are known, but these motions are mainly used to overcome machine limitations (as opposed to tool limitations) for appropriately representing a desired theoretical generating gear. For example, some bevel and hypoid gear generating machines are built without a provision for inclining the tool axis with respect to the machine axis (cradle axis) representing the axis of the theoretical generating gear. U.S. Pat. No. 2,310,484 to Wildhaber discloses a method of compensating for this machine limitation by modifying the rate of the generating roll in the course of generation to approximate motion about an axis of a theoretical generating gear that is inclined to the axis of the tool. This method is also known as "modified roll" In U.S. Pat. No. 2,773,429 to Wildhaber, a linear oscillating motion along the machine axis timed with generating roll is used for substantially the same purpose. Finally, it is known from U.S. Pat. No. 2,824,498 to Baxter et al. and a publication by Baxter entitled "An Application of Kinematics and Vector Analysis to the Design of a Bevel-Gear Grinder", American Society of Mechanical Engineers, 1964, to relatively translate the work gear in a direction substantially perpendicular to the machine cradle axis timed with generating roll to emulate a large crown gear and therefore enabling the formation of low shaft angle gears. This motion is also referred to as "vertical motion".

In view of the above discussion, it may now be appreciated that most of the fundamental teachings in the art of conventional bevel and hypoid gear generation may be attributed to the work of one inventor, Ernest Wildhaber, and most of that work was accomplished over thirty years ago. Since that time, the most important methodological advances in the art of bevel and hypoid gear generation have related to improved procedures for determining appropriate machine settings based upon Mr. Wildhaber's earlier work. The process by which machine settings are determined to produce acceptable tooth contact characteristics in work gears is known in the art as "development". Today, computer programs are used in the development process to take best advantage of the known possibilities for setting up bevel and hypoid gear generating machines to represent various theoretical generating gears.

Despite the availability of computer processing techniques and the long familiarity in the art with the effects of various representations of theoretical generating gears, it is often not possible to develop mating tooth surfaces with the exact contact characteristics that may be desired. Although it is usually possible to develop tooth contact characteristics which are at least marginally satisfactory, results are inconsistent from one job to the next.

Until recently, most bevel and hypoid generating machines were constructed to enable a tool together with its relative motions to represent a theoretical generating gear rolling through mesh with a work gear with a minimum number of machine axes performing controlled movements during machine operation. For example, conventional machines for performing intermittent indexing operations are often referred to as "two-axis" machines because the generating operation on individual tooth spaces requires only a single timed relationship between two of the machines moveable axes. The timed relationship involves rotating a tool about a machine cradle axis in a predetermined ratio with rotation of a work gear about its axis. Together, the two timed motions represent the rotation of a theoretical generating gear in mesh with the work gear. Of course, the tool is also rotated about its axis to perform its required cutting function, but the rotational speed of the tool may be selected independently of the rotational speed of the work gear or machine cradle.

Although controlled movements about only two machine axes are required to represent the motion of a theoretical generating gear rolling through mesh with a work gear, many more axes are required to appropriately position the tool with respect to the work gear to define the theoretical generating gear itself. For example, three angular settings are required to position the tool axis with respect to the cradle axis, and one other angular setting and at least three rectilinear settings are required to position the cradle axis with respect to the work gear axis.

Conventional machines for performing continuous indexing operations are referred to as "three-axis" machines because their operation requires rotation about a third axis (i.e., the tool axis) which is controlled in accordance with a second timed relationship with rotation about the work gear axis. Rotation of the tool together with the work gear defines a continuous indexing relationship which enables the much slower generating motion between rotations about the cradle axis and work gear axis to be superimposed for collectively generating all of the tooth spaces in the work gear. However, substantially all of the same axes as described for the two-axis machines are required for purposes of setup.

Additional timed relationships between machine axes, such as movements along the machine cradle axis in time with rotation of the cradle axis have been added to conventional machines in accordance with the earlier mentioned teachings involving solutions for minimizing residual errors in generated tooth surfaces. However, the basic configuration of the conventional machines for representing theoretical generating gears remained substantially unchanged for a long period of time.

Recently, the assignee of the present invention introduced a new type of bevel and hypoid gear generating machine (see U.S. Pat. No. 4,981,402 which corresponds to WO 89/01838) which is designed with a minimum number of machine axes while providing for controlling timed relationships between most if not all of the machine axes. The reduced number of machine axes requires most of the machine axes to be controlled for performing even the simplest generating operations previously requiring only one or two timed relationships between machine axes. However, the same controlled axes may be used to accommodate all of the other known timed relationships between the axes of conventional machines.

In fact, the new machine includes the minimum number of moveable machine axes (i.e., three rectilinear axes and three rotational axes) that are kinematically required to orient the tool in any desired orientation with respect to the work gear. Of course, travel restrictions along and about the new machine axes limit the region of space within which such relative orientations can take place, but the new machine axes are configured so that the region encompasses even more space than can be defined by the many more axes of a comparatively sized conventional machine.

The new machine also makes possible a virtually unlimited number of new relative motions between the tool and work gear for generating tooth surfaces in a work gear. To date, however, the new machine has only been used to control relative motions between the tool and work gear as if it were a conventional machine having a minimum number of controlled axes. In other words, although it is known to control all of the moveable axes of the new machine for the purpose of performing known generating operations with fewer total machine axes, no teachings have been available which would enable the new machine to perform any differently than a conventional machine. In fact, as explained above, there have not been any significant new motions suggested for bevel and hypoid gear generating machines in over thirty years. Moreover, for some time now it has been known to apply computer numeric controls to most of the axes of conventional machines, but there has been no teaching to suggest any benefits from controlling more of the axes of the conventional machines during operation.

Thus, the state of the art in which the present invention was made includes well known generating processes that have been long known and practiced. Modern computer techniques have been used to optimize machine setup and operation according to the known generating processes for reducing residual errors in tooth surface geometries and achieve at least marginally acceptable contact characteristics between members of work gear pairs.

SUMMARY OF THE INVENTION

The present invention is directed to a process of modifying standard generating motions for producing bevel and hypoid gears in order to effect desired tooth surface geometries. Additional controlled motions are included substantially simultaneously with the standard generating motions to bring about desired surface characteristics.

The standard generating motions for bevel and hypoid gears comprise operatively engaging a rotating tool with a work piece in a predetermined rolling motion about a theoretical axis of rotation. During generation, the rotating tool is carried in a circular arcuate path the center of which represents the axis of rotation of a theoretical generating gear. The teeth of the theoretical generating gear, represented by the stock-removing surfaces of the tool, mesh with the work gear and thus form the tooth surfaces of the work piece.

A first inventive additional controlled motion comprises varying the position of intersection of the theoretical axis and the pitch plane relative to the work gear. This additional motion may be described by a mathematical function and may take place parallel to the instant line of relative rotation, thus changing the generating cone distance in process, in a direction perpendicular to the instant line of relative rotation, thus changing the generating work offset in process, or in a direction containing components of both the above-named directions. Furthermore, the direction of motion may vary during the generating process.

A second inventive additional controlled motion comprises varying the orientation and position of the teeth of the generating gear relative to the body of the generating gear which carries them. These motions may also be described by a mathematical function. The motions comprise rotating a tooth or teeth of the generating gear thereby changing the nominal spiral angle, nominal pressure angle, lengthwise and profile geometry, or combinations thereof, of the generating gear during the generation process.

The disclosed inventive additional controlled motions may be utilized singularly or in any combination or sequence in order to produce a desired tooth surface effect on a bevel or hypoid gear.

A tool and work gear may be mounted for rotation in respective tool and work gear supports. According to the present invention, the tool is rotated, and after the tool is rotating, the tool and work gear are operatively engaged in a predetermined rolling motion, as discussed above, according to the standard practice. However, the standard generating motions are modified by including the inventive additional controlled motions substantially simultaneously with the standard generating motions. The inventive method may be computer controlled, preferably computer numerically controlled.

On machines having a plurality of computer controlled axes for positioning and operatively engaging a tool with a work gear, the process of the present invention comprises computing initial setup positions based on setup parameters input to the machine and moving the computer controlled axes to the setup positions for initially positioning the tool and work gear with respect to each other. Once the initial setup positions are attained, further operating positions are computed in response to operating parameters input to said machine. The computer controlled axes are moved to the further operating positions for operatively engaging the tool and work gear in a manner to impart a predetermined relative rolling motion between the tool and work gear. This motion is the standard generating motion as discussed above. The present invention includes moving, substantially simultaneously with the relative rolling motion, the computer controlled axes to effect the inventive motions discussed above, namely, (a) to vary the position of intersection of the theoretical axis of rotation and the pitch plane relative to the work gear and/or (b) to vary the orientation of the tooth surfaces of the theoretical generating gear with respect to the body of the theoretical generating gear. Finally, the steps of computing further operating positions and moving the computer controlled axes to the further operating positions are repeated in order to complete the generating operation.

DETAILED DESCRIPTION OF THE PREFERRED EMBODIMENTS

The details of the invention will now be discussed with reference to preferred embodiments and the accompanying Drawings which represent the invention by way of example only.

In the context of the present invention, the term "bevel" is intended to be of sufficient scope to include those gears known as "hypoid" gears.

The present invention comprises a process which enables the standard generating motions for producing bevel and hypoid gears to be modified in a manner by which additional controlled motions are included with the standard motions to effect desired tooth surface geometries.

Throughout the specification, the inventive motions are specified as additional controlled motions of the generating gear or tool relative to a fixed position of a work gear or axis of a work gear. This description is not limiting on the present invention and is chosen for convenience and clarity only. The operative mechanism of the present invention is the relative motion between the generating gear and work gear. The description of relative motion can equally be set forth as the work gear moving relative to a fixed generating gear or both the work gear and generating gear moving to effect the desired motion.

The process of the present invention may be carried out on any machine capable of including additional motion along with standard generating motions. Mechanical machines may include specially designed cams to introduce the added motion, however, this approach would be difficult or impractical as such a mechanical machine would be extremely complex to build. It is preferable to utilize machines such as that disclosed in PCT/US87/02083 filed Aug. 24, 1987 and published as WO 89/01838 on Mar. 9, 1989 for carrying out the present inventive process. The above-identified disclosure is the basis for and corresponds to commonly assigned application U.S. Ser. No. 104,012 filed Aug. 24, 1987, now U.S. Pat. No. 4,981,402 the disclosure of which is hereby incorporated by reference. This machine is of the type generally known as computer numerically controlled, or CNC, machines which comprise a plurality of axes along which movement of a grinding or cutting tool and a workpiece can be controlled in order to orient the tool and workpiece relative to one another in almost any position within the operational limits of the machine.

CNC machines for controlling movement of multiple machine axes along prescribed paths are now commonplace. Such state-of-the-art systems are incorporated in the present invention to control movements of selected axes along prescribed paths for orienting a tool with respect to a workpiece, specifically a work gear.

Figure 1:
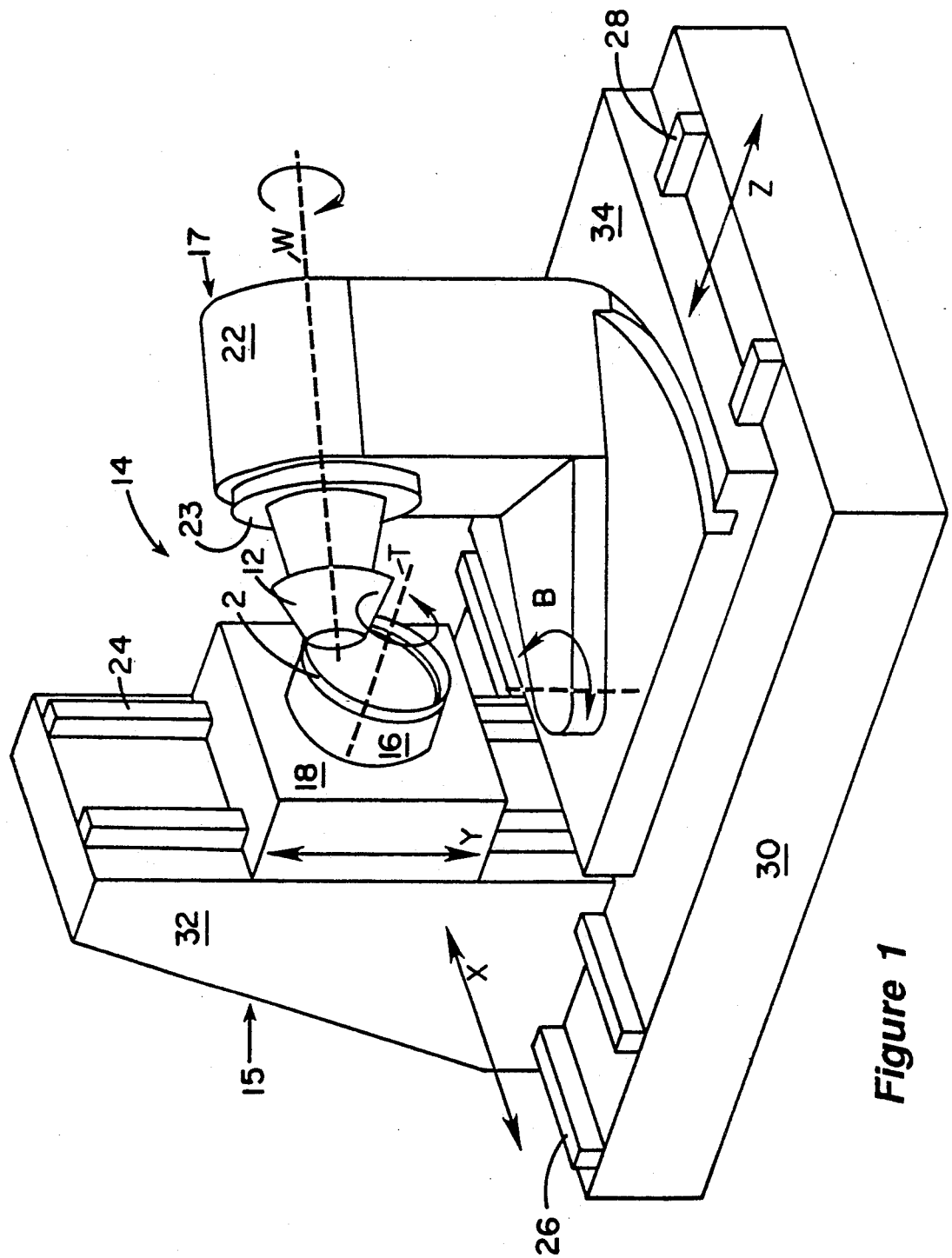
FIG. 1 is a schematic representation of an apparatus for carrying out the process of the present invention.

A machine similar to previously mentioned U.S. Pat. No. 4,981,402 is shown in FIG. 1. The apparatus 14 comprises a tool support 15 for a tool 2. In FIG. 1 the tool 2 is shown to be a cup-shaped grinding wheel. However, it is to be understood that any tool utilized in a process for producing bevel and hypoid gears, such as a cutting tool, may be mounted on the tool support 15. The tool 2 is releasably mounted to a tool spindle 16 which in turn is journaled for rotation in a tool head 18. Tool head 18 is capable of vertical movement (Y-axis) along ways 24 attached to carriage 32. Tool support 15 is capable of horizontal movement (X-axis) along ways 26 attached to machine base 30. Tool 2 is capable of rotary movement about its rotational axis T.

Apparatus 14 also comprises work support 17 wherein work gear 12 is releasably mounted to work spindle 23. Work spindle 23 is journaled for rotation in work head 22 and is capable of rotary movement about a longitudinal axis W. Work head 22 is mounted onto table 34 and is capable of angular (pivotal) movement about vertical axis B. Table 34 is capable of horizontal movement (Z-axis) along ways 28 attached to machine base 30.

Ways 24, 26 and 28 permit relative linear movement of the tool 2 and work gear 12 in three mutually orthogonal directions.

Movement of tool spindle 16, work spindle 23, work head 22, table 34, tool head 18 and carriage 32 is imparted by separate drive motors (not shown). The above-named components are capable of independent movement with respect to one another and may move simultaneously with one another. Each of the respective motors is associated with either a linear or rotary encoder (not shown) as part of a CNC system which governs the operation of drive motors in accordance with input instructions input to a computer (not shown). The encoders provide feedback information to the computer concerning the actual positions of each of the movable axes.

It can be clearly seen that by relative movement of the tool 2 and work gear 12 along any or all axes it is possible to orient the tool 2 and work gear 12 with respect to one another so that any area of the work gear 12 may be presented to the tool 2. Once presented, movement of the tool 2 and/or the work gear 12 is effected to cause the tool 2 to engage the work gear in a generating motion incorporating conventional generating motions and any of the above-described additional controlled motions as a function of a chosen parameter, for instance the theoretical generating gear rotation. The tool path is directed by the computer, in response to input instructions, to control movements along respective axes in order to produce a desired tooth surface geometry.

In fundamental bevel gear theory, mating gears of a gear-set are said to be in mesh with each other and with an imaginary member known as the "crown gear". The crown gear in bevel gearing is analogous to the "rack" member in parallel axis gearing, and is discussed in many mechanical engineering texts. Since it meshes with both the gear and pinion of a gear-set, the crown gear serves as the basis for bevel gear manufacture; that is, all bevel gear generators, to date, derive from the crown gear model and simulate the mesh of the crown gear with the work gear. For hypoid gear sets, the imaginary member in mesh with the gear set is a helicoidal segment. In the present invention, "generating gear" is intended to include any generating surface, especially crown gears and helicoidal segments, depending upon the type of gears being generated.

Figures 2A, 2B:
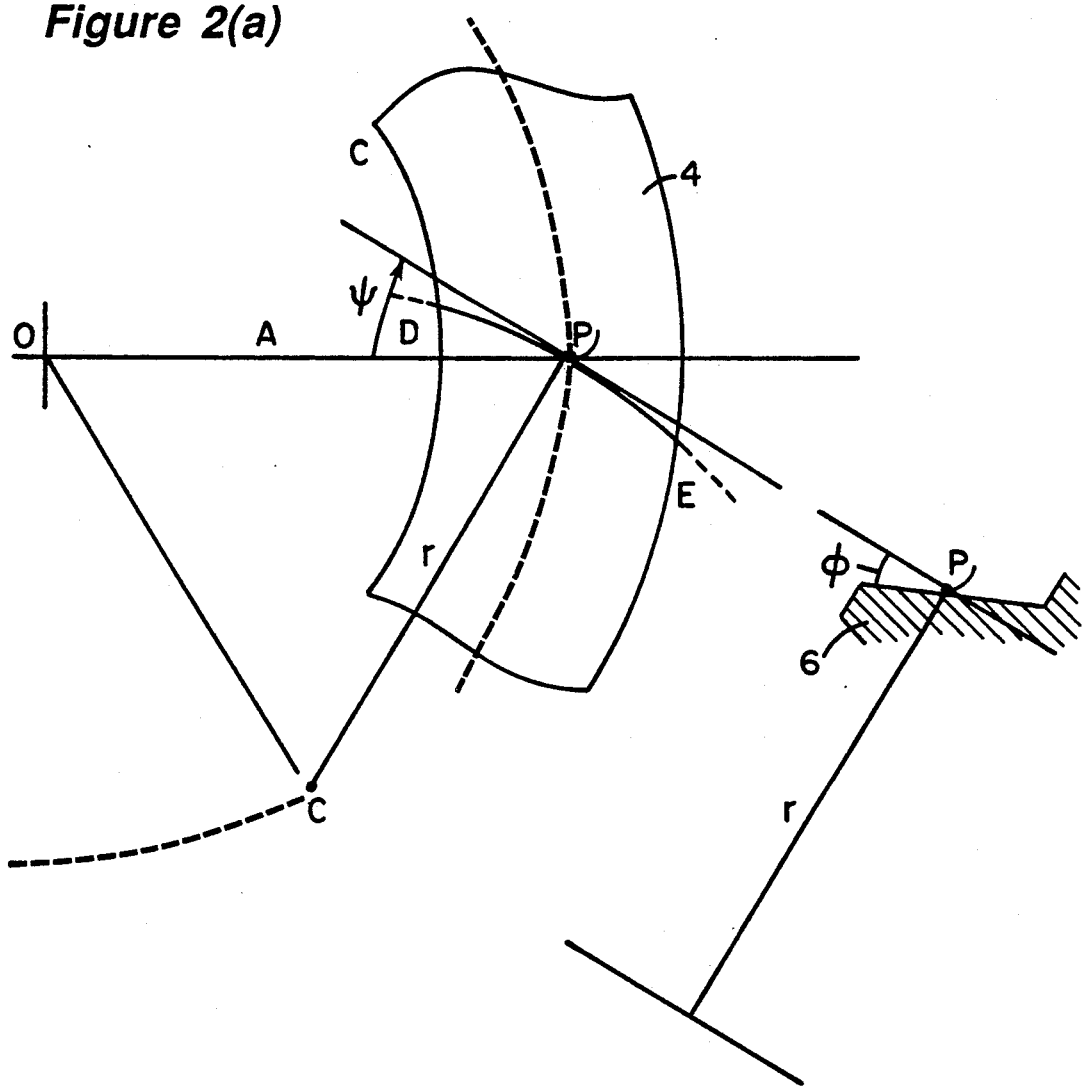
FIG. 2a illustrates elements of the basic geometry of a spiral bevel or hypoid generating gear.
FIG. 2b illustrates the pressure angle of a spiral bevel or hypoid generating gear.

FIG. 2a shows basic geometric elements of a spiral bevel generating gear. Point C is the center of a cutting or grinding tool and point O is he center of the generating gear 4. The design point, denoted P, is a reference point about which various tooth characteristics, such as pressure angle and spiral angle, are defined. Designers often choose point P to coincide with the "pitch point" of the gear-set. Point P is located a distance A from point O. Distance A is known as the "cone distance" of the generating gear. Curve DPE is the lengthwise curve of a single tooth, which lies askew to line OP by the "spiral angle" of the generating gear, angle $\Psi$. Since point O is the center of the generating gear this point also represents the location of the axis of rotation of the generating gear. In FIG. 2a the axis of rotation would be perpendicular to the plane of the paper.

FIG. 2b is a projection of FIG. 2a illustrating the pressure angle, $\phi$, of a tooth 6 of the generating gear 4.

Figure 3:
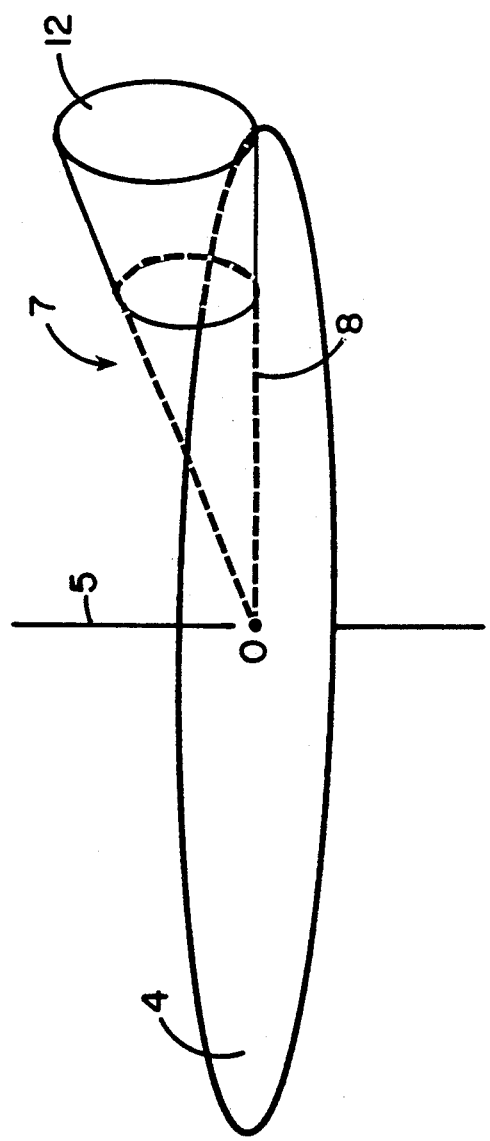
FIG. 3 illustrates the pitch surface of a work gear rolling on that of a generating gear.

FIG. 3 illustrates the pitch or rolling surfaces of a work gear 12 and a planar generating gear 4. It can be seen that if the pitch surface of work gear 12, in this case a bevel pinion, is extended to point O, a cone 7 is formed. This cone is known as the "pitch cone". A cone rolled on a flat surface produces a line of contact and therefore it can be seen that rolling pitch cone 7 on generating gear 4, with no slipping, results in line 8 which is known as the instant line of relative rotation between the work gear 12 and the generating gear 4. The plane which is tangent to the pitch cone 7 of the work gear 12 and contains the instant line of relative rotation 8 between the work gear 12 and the generating gear 4 is known as the "pitch plane". In FIG. 3 the generating gear 4 would lie in the pitch plane and the axis of rotation 5 of the generating gear 4 would intersect the pitch plane at point O. The pitch plane and the instant line of relative rotation will be further discussed below. Analogous surfaces for hypoid gears are known and are discussed in publications such as, Wildhaber, "Basic Relationship of Hypoid Gears", American Machinist, Volume 90, Numbers 4,5 and 6, February, 1946, the disclosure of which is hereby incorporated by reference.

Returning to FIG. 2a it is seen that curve DPE and spiral angle Ψ are produced by placing the center of a circular cutter at point C. The cutter blades represent one or more teeth of the generating gear 4. Here "r" denotes the radius of the cutter. For simplicity it is assumed that curve DPE is a circular arc, but it may be any regular curve, for instance an epi-cycloidal arc segment which results from continuous indexing processes. To simulate the rotation of the generating gear 4, cutter center C is moved about point O in a circular path, that is, distance OC remains constant.

Figure 4:
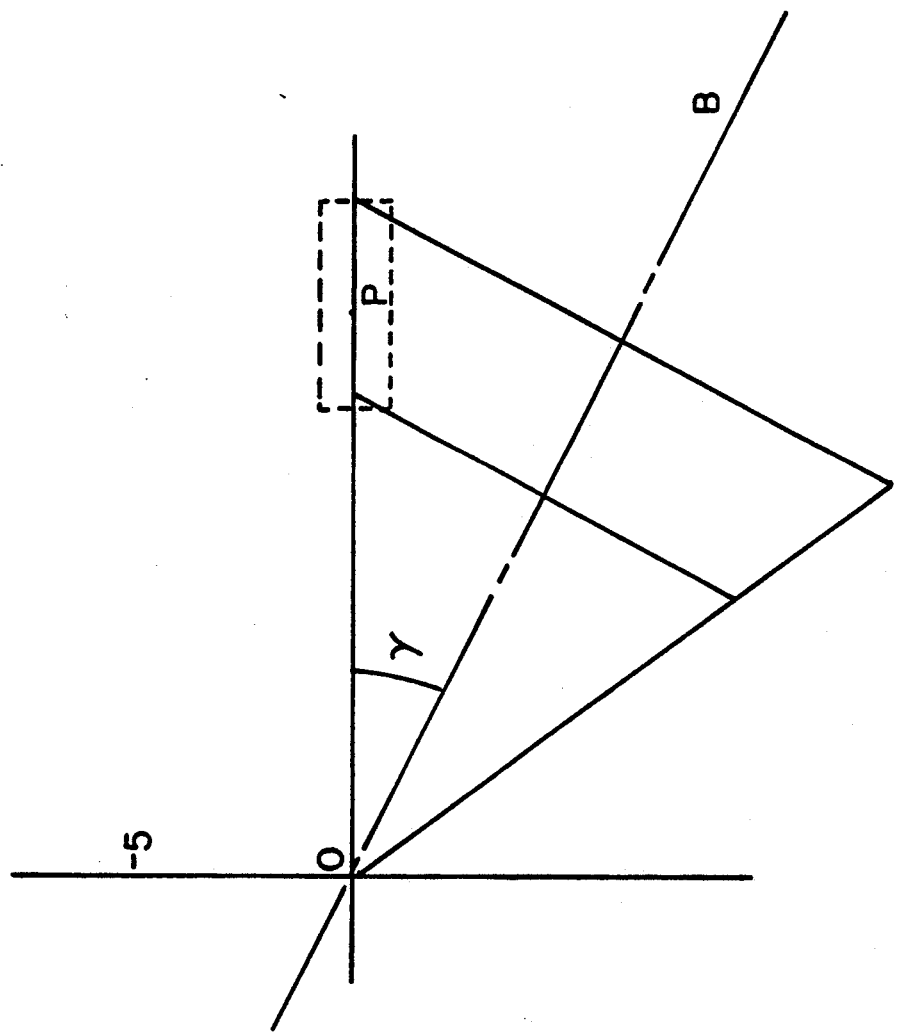
FIG. 4 is a plan view of the pitch surfaces of a work gear in engagement with a generating gear.

The teeth on a bevel gear are formed by bringing the generating gear and the work piece into engagement and rotating them about their respective axes at a known ratio. Meanwhile, a tooth of the generating gear, represented by the stock removing surfaces of the tool, removes material from the work gear. This process is known as generation. FIG. 4 shows a plan view of the pitch surfaces of a planar generating gear and a work gear. Line OB is the axis of the work gear, and line 5 is the axis of the generating gear. The work gear is oriented at an angle γ relative to the plane of generating gear rotation. Basic bevel gear theory dictates that the rotations of the work gear and the generating gear be related as follows:

Work gear rotation = generating gear rotation / sin γ

Gear sets with tooth surfaces formed as described above will mesh properly under perfect running conditions. In practice, these "perfect" surfaces must be modified so that the gear set can accommodate misalignments and deflections during operation. Such modification is known as surface mismatch.

Surface mismatch is effected by departing from the fundamental generating gear and work gear setup described above. Several setup changes are used throughout the bevel gear industry and their effects are widely known.

Figure 5:
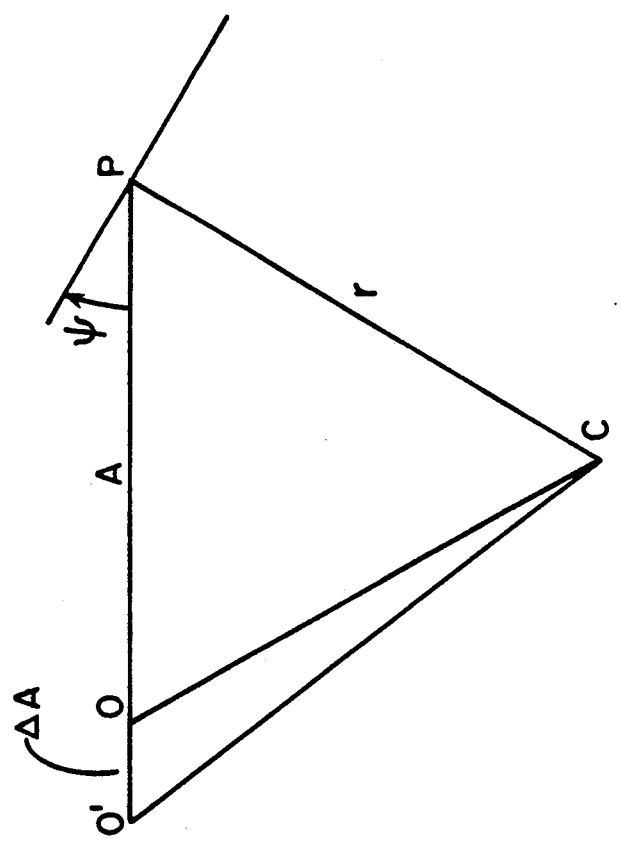
FIG. 5 schematically shows a "cone distance" setup change.
Figure 6:
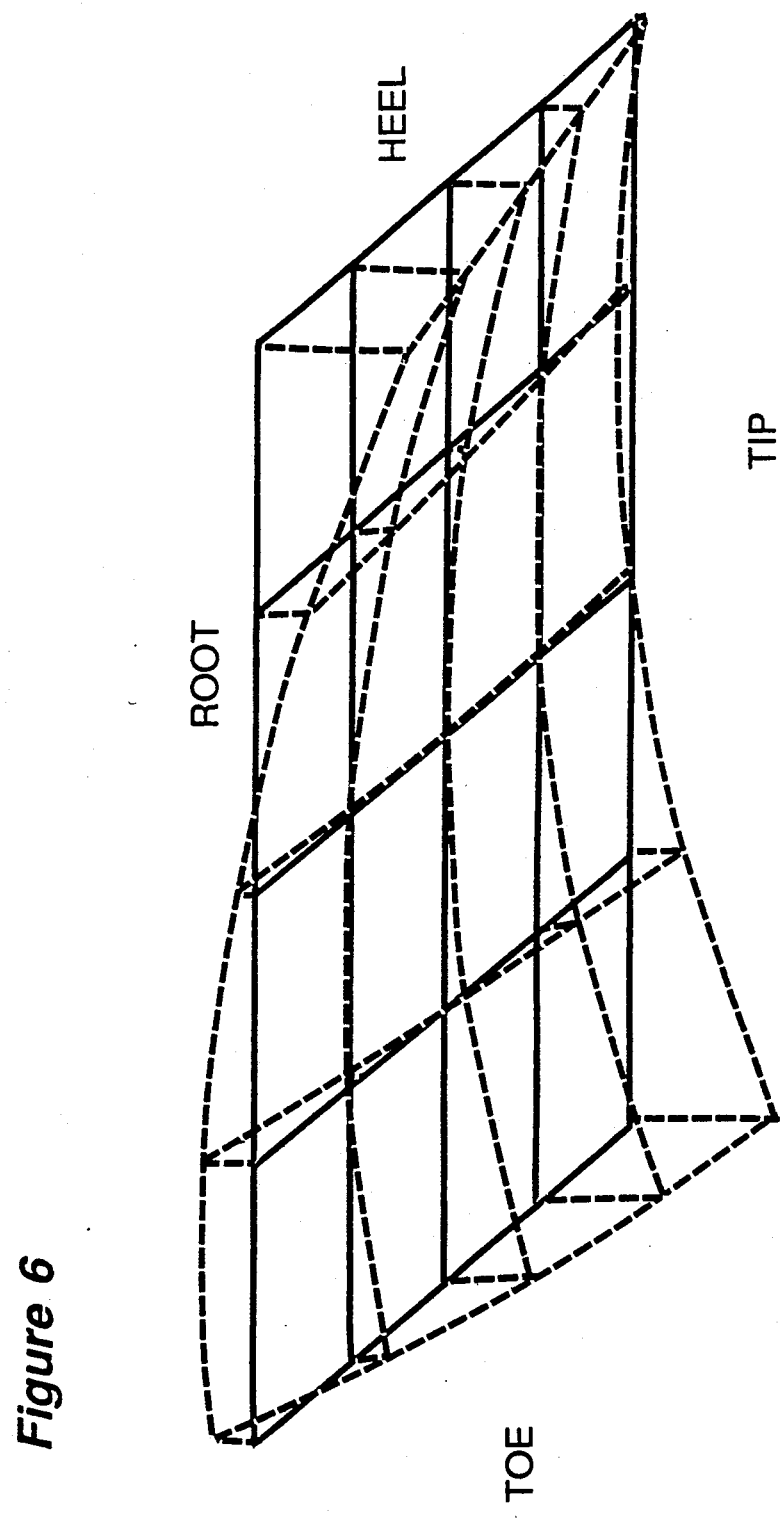
FIG. 6 shows a topological map of a surface change induced by a cone distance setup change.

For instance, FIG. 5 shows a line diagram similar to that of FIG. 2a. Instead of using a generating gear centered at point 0, a generating gear centered at point O' is used, effectively enlarging its size, while the size of the work gear remains fixed. This is known as a "cone distance" change, and has the effect of inducing "bias", or a slight warping of the tooth surface relative to the conventional surface. FIG. 6 shows a topological map of the surface change induced by "cone distance" change ΔA (distance O'O). Here the flat surface represents the basic unmodified tooth surface geometry. The curved surface represents a departure from the unmodified surface caused by a "cone distance" change. Note that this change must be accompanied by a change of the work gear rotation speed relative to the generating gear. This quantity, known as the "ratio-of-roll", assures that the spiral angle and pressure angle of the gear-set remains substantially unchanged.

Figure 8:
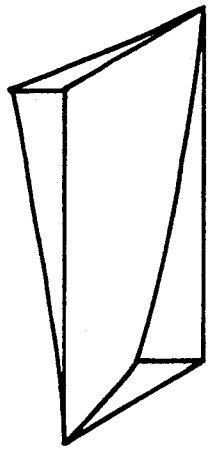
FIG. 8 shows a topological map of a surface change induced by a generating offset setup change.
Figure 7:
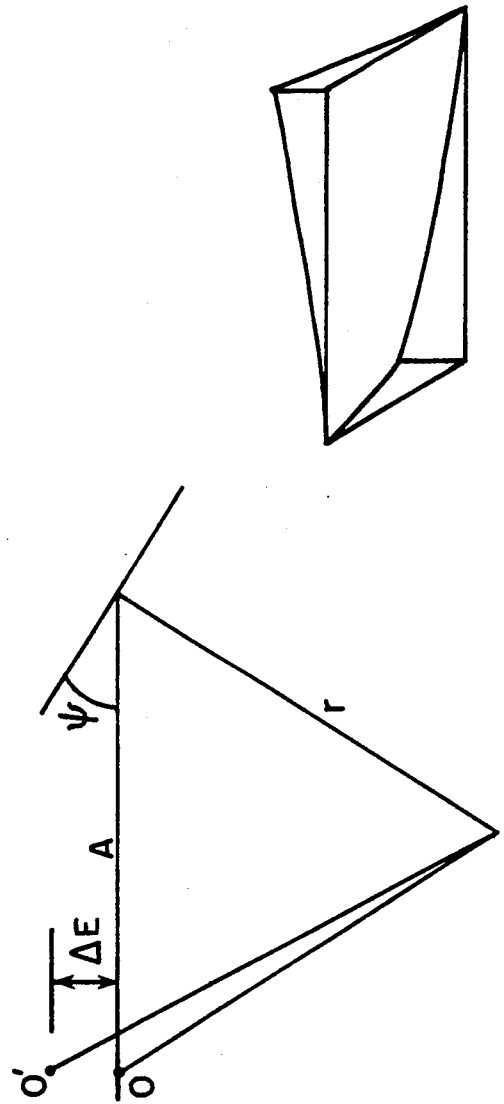
FIG. 7 schematically shows a "generating offset" setup change.

As another example, FIG. 7 shows a change in "generating offset" denoted ΔE. This change moves the center of the generating gear in the direction shown while the work gear remains in a fixed position. It has the principle effect of removing or adding material to the profile of the tooth surface, see FIG. 8, depending on the direction of the change. Again, the ratio-of-roll must be adjusted to hold the spiral and pressure angles substantially constant.

Figure 9:
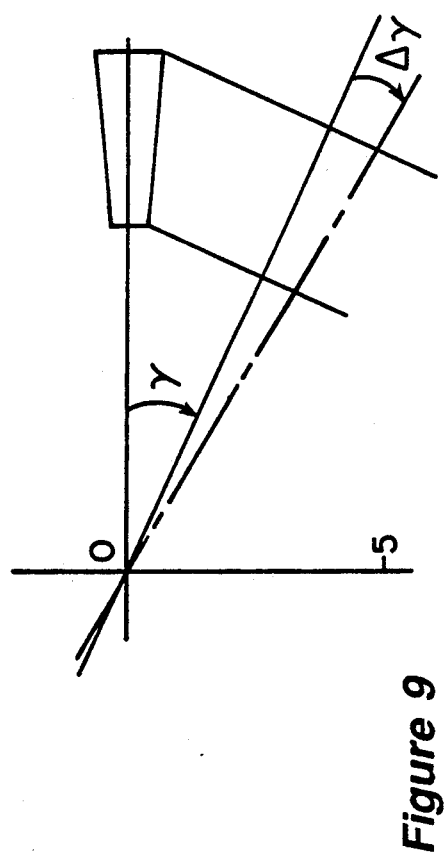
FIG. 9 illustrates a setup change involving changing the angle of presentation of the work gear to the generating gear.

Another known generating gear change involves changing the angle, γ, of presentation of the work gear relative to the generating gear, by an amount Δγ, as shown by FIG. 9. Here too, the ratio-of-roll must be adjusted to hold the spiral angle and pressure angle substantially constant.

Other means to introduce mismatch may be used in conjunction with the changes described above. For instance, the tool axis, nominally parallel to the generating gear axis, may be tilted relative to its usual position. In addition, tools with curved profiles may be used instead of straight sided tools. Both of these changes differ from those described earlier in that they are changes to the geometry of the teeth on a generating gear and do not modify the motion or kinematic geometry of the generating gear as a whole. These changes are very common and may be used freely without need for compensating motions.

All of the above mentioned changes are similar in that the work gear is made using a conventional generating gear model, albeit one which differs slightly from that taught by fundamental bevel gear theory. The generating gear and the work gear simply rotate about their respective axes at a constant rate.

Various supplementary generating motions have been developed to solve different tooth geometry problems. They are all known in the art and have been applied for many years. Among them are the previously mentioned "helical motion" as disclosed by U.S. Pat. No. 1,980,365, "vertical motion" as disclosed by U.S. Pat. No. 2,824,498, and "modified roll" as disclosed by U.S. Pat. No. 2,310,484, the disclosures of each being hereby incorporated by reference.

Figure 10A:
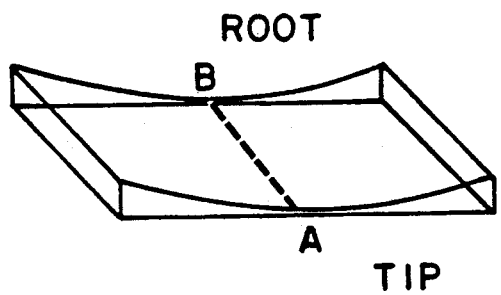
FIGS. 10a, 10b, and 10c illustrate three fundamental variations of second order surfaces, lengthwise, profile and bias surfaces respectively, as applied to gearing.
Figure 10B:
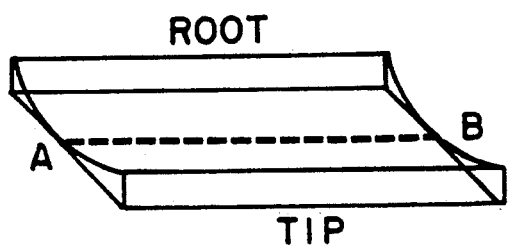
Figure 10C:
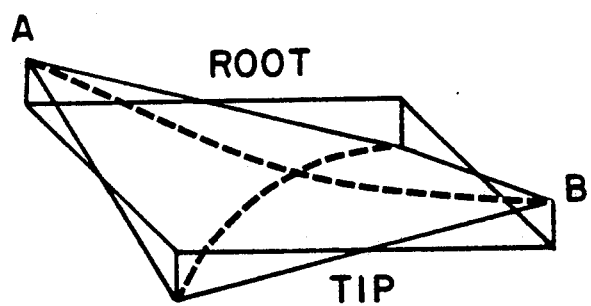

In the field of bevel gearing it is common to describe the difference between two tooth surfaces as a surface change with characteristics of definite mathematical "orders". FIGS. 10a, 10b and 10c show the three fundamental variations of second order surfaces as applied to gearing. Each surface possesses a line of symmetry, denoted AB, about which the surface varies in substantially equal measure and direction.

Figure 11:
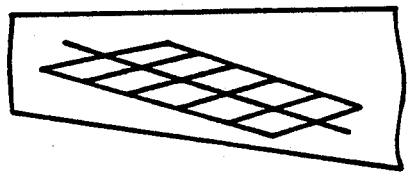
FIG. 11 shows the skewed path of contact on a gear member as a result of the surface bias.

The second order surface shown in FIG. 10a, for example, represents a change in lengthwise tooth curvature. Here, line AB is substantially a line of symmetry about which material is removed from the base tooth surface being considered. Such a tooth surface change causes contact between mating gears to be localized in the center of the tooth. Similarly, FIG. 10b represents a change in profile tooth curvature. Such a change is often effected by forming the gear teeth with blades possessing curved profiles. It has the general effect of inducing a parabolic motion error transferring function between members of a gearset, thus enhancing its adjustability. FIG. 10c shows what is referred to in the field of gearing as a "bias" surface. Note that line of symmetry AB is not aligned with either the lengthwise or profile directions of the gear tooth. Surface bias has the effect of skewing the path of contact on the gear member, as seen in FIG. 11.

Figure 12A:
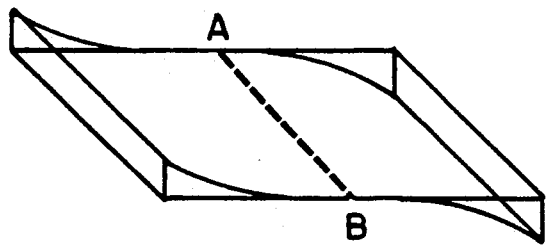
FIGS. 12a, 12b, 12c, and 12d illustrate four fundamental variations of third order surfaces.
Figure 12B:
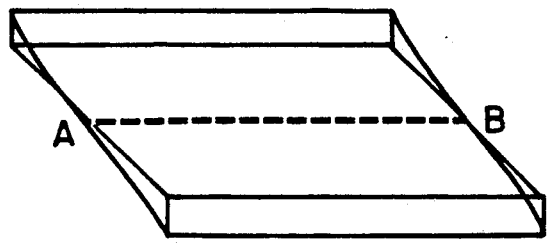
Figure 12C:
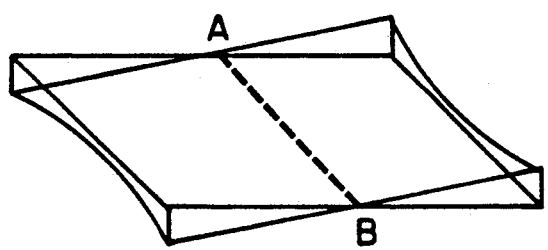
Figure 12D:
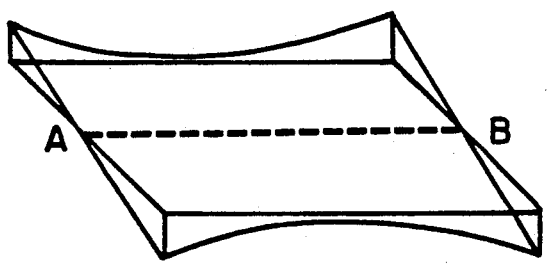
Figure 13:
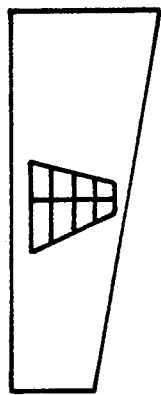
FIG. 13 shows a "diamond" tooth bearing caused by a third order surface such as that shown in FIG. 12d.

FIGS. 12a, 12b, 12c and 12d show the four fundamental variations of third order surfaces. Each surface possesses a line about which the surface varies in substantially equal measure, but in opposite direction. For instance, FIG. 12a depicts a third order surface extending along the lengthwise tooth direction. The surface varies in substantially equal amounts about line AB, but in opposite directions. Likewise, the surfaces vary in substantially equal amounts but opposite directions about lines AB in FIGS. 12b, 12c and 12d. Third order surface characteristics are not generally regarded to be beneficial to the performance of gearsets. For example, a "diamond" tooth bearing, FIG. 13, is caused by a third order surface such as that in FIG. 12d.

Figure 14:
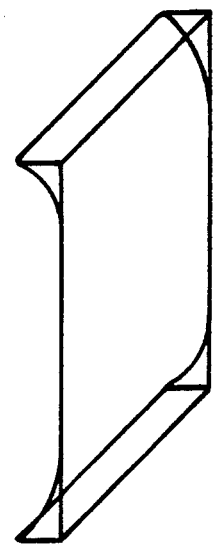
FIG. 14 illustrates an example of a fourth order surface.

FIG. 14 shows one example of a fourth order surface. This particular surface is changed from the base surface only at the extremities of the tooth. Fourth order surface characteristics are useful for modifying tooth surface geometry at their extremities while leaving the major portion of the tooth surface intact.

Surfaces characteristics of arbitrarily high order may be defined, however, in the field of gearing, surfaces of the fifth order and above are regarded as having little practical effect on gearing geometry.

In the present invention, a tool may be mounted for rotation about its axis in a tool support and a work gear may be mounted for rotation about its axis in a work gear support. According to the present invention, the tool is rotated and engaged with the work gear in a predetermined rolling motion about a theoretical axis of rotation. The theoretical axis of rotation represents the axis of rotation of a theoretical generating gear. The axis of the theoretical generating gear, hereinafter referred to as the generating gear, intersects the pitch plane of the work gear and the generating gear. The generating gear rolls in mesh with the work gear and the tooth surfaces of the generating gear are represented by the stock removing surfaces of the tool.

A first embodiment of the present invention comprises substantially simultaneously with the generating motion, varying the position of intersection of the generating gear axis and the pitch plane relative to the fixed position of the work gear.

Figure 15:
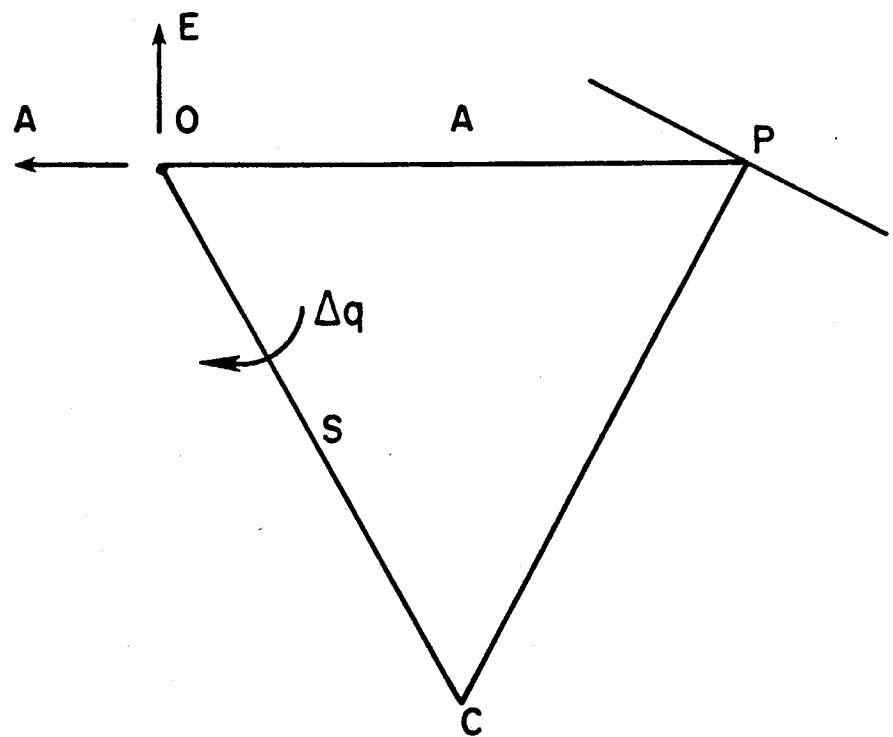
FIG. 15 schematically illustrates a first embodiment of the present invention wherein the generating gear axis varies its position of intersection with the pitch plane during generation.

FIG. 15 illustrates this motion wherein it can be seen that the generating gear axis located at point 0 may change position of intersection with the pitch plane which in this figure is represented by the plane of the paper. It can be seen that the point of intersection may vary along direction A which is substantially parallel to the instant line of relative rotation between the work gear and the generating gear or direction E which is substantially perpendicular to the instant line of relative rotation between the work gear and the generating gear or the direction may contain a component of both A and E. The point of intersection varies as a function of generating gear rotation, $\Delta q$, measured from some reference position.

The position of the generating gear axis may vary during generation according to a mathematical function. Any one of a plurality of functions may be selected. It should be understood that while the equations discussed below are in polynomial form, the present inventive motions are not limited to being expressed as polynomials. In the present invention, for example, a power series is preferred since it is a long established means of expressing a wide range of mathematical functions. The terms of the power series control the rate of change in the generating gear axis position. Movement in direction A of FIG. 15 denotes a change in cone distance and the change may be expressed as:

$$DA = DA_0 + DA_1 \cdot \Delta q + DA_2 \cdot \Delta q^2 + \ldots$$

wherein:

DA = the total change in generating cone distance for a given generating gear displacement $\Delta q$, $DA_0, DA_1, DA_2, \ldots$ = constants selected to control the exact relationship between the tool and work gear, and, $\Delta q$ = the displacement of the generating gear measured from a known position, usually the center of generating roll.

Figure 16:
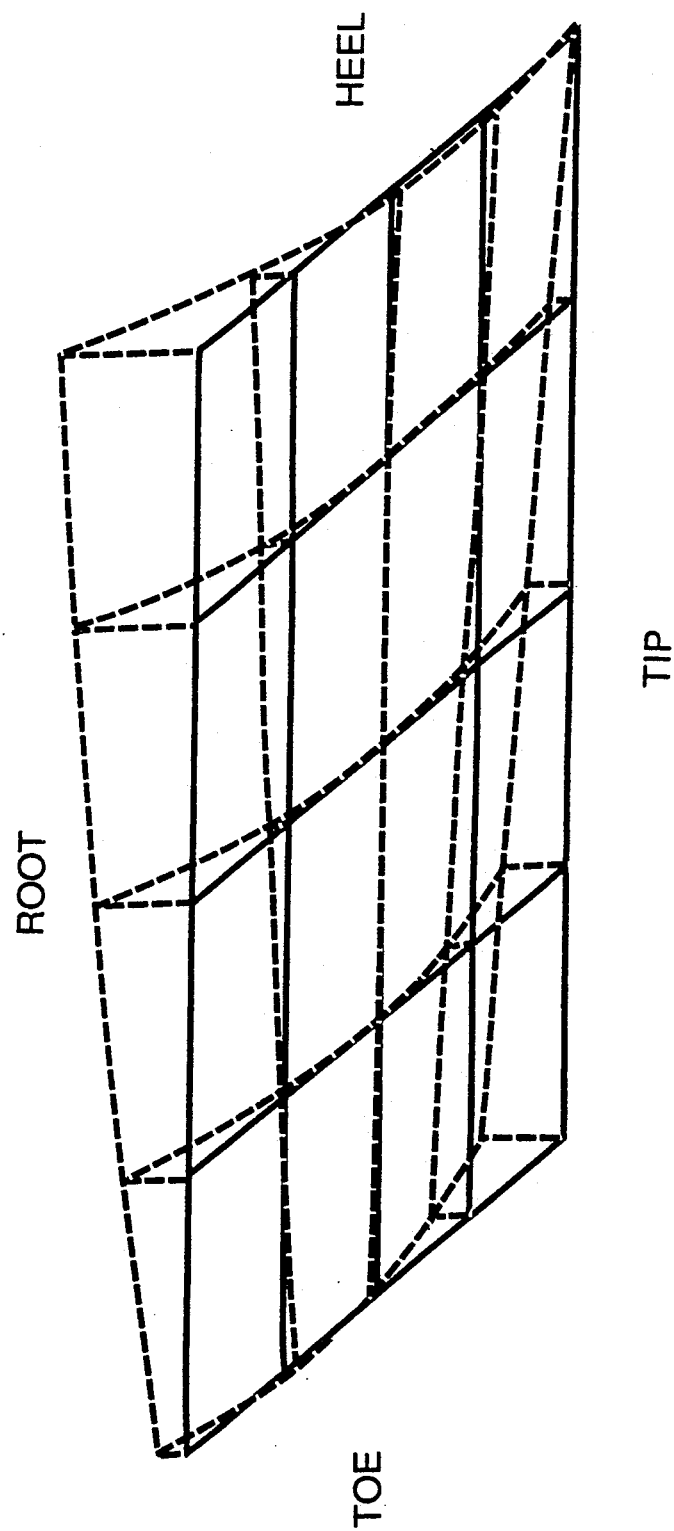
FIGS. 16, 17, 18 and 19 show topological maps representing the effects of the inventive motion on a tooth surface according to a first embodiment.
Figure 17:
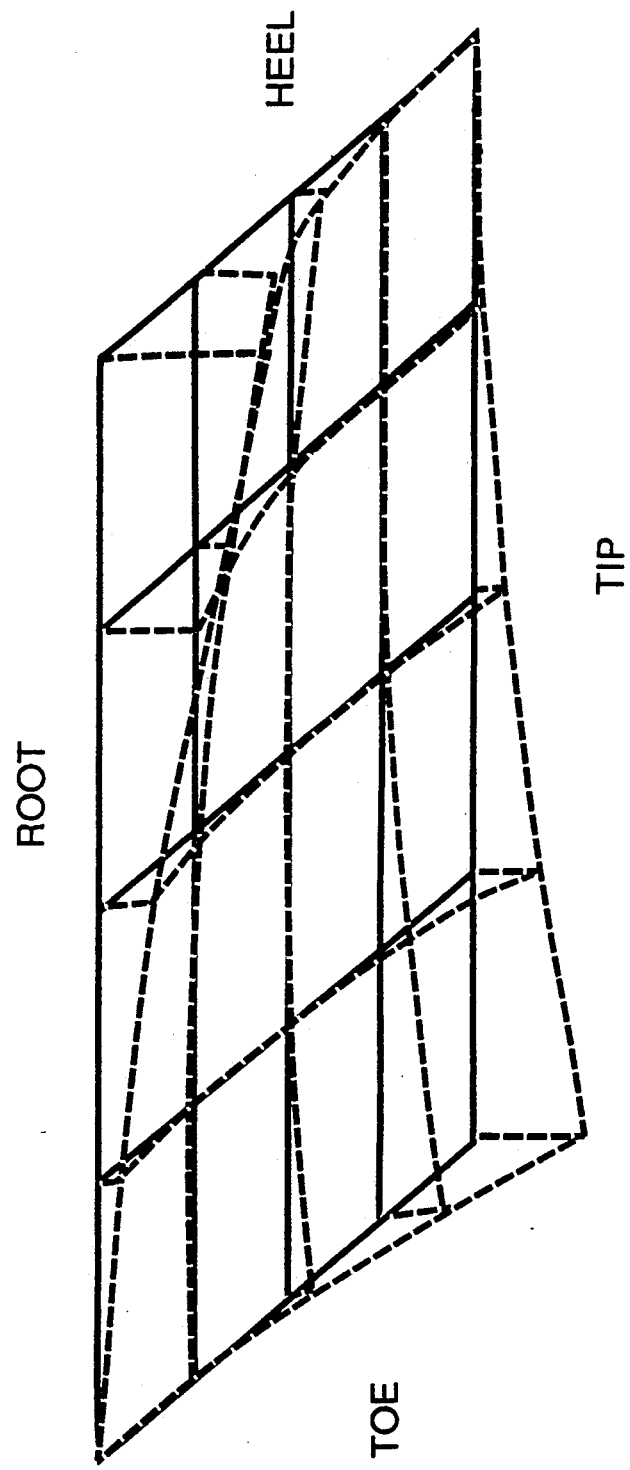

The effects of terms $DA_1$ and $DA_2$ are shown by FIGS. 16 and 17 respectively. The term $DA_0$ represents a known setup change and introduces "bias" to the tooth surface. The "flat" surfaces represents the base surface which is a surface to which no modifications have been made. In the Figures the nominal spiral angle and nominal pressure angle are held constant at the design point, generally the center, of the tooth. This is known as holding first order and will be discussed further below. The root line, that is, the depth to which a work gear tooth is cut, measured along the tooth, is also held substantially constant. Maintaining an acceptable root line will also be discussed below.

FIG. 16 illustrates the effects of the motion component $DA_1$. This term controls the velocity of change in the cone distance during generation. It can be seen that this term introduces a bias change in the tooth surface from heel to toe. Along with the bias change, a change of profile curvature and a small change in lengthwise curvature are shown.

FIG. 17 denotes the effects of the motion component $DA_2$. This term controls the acceleration of change in the cone distance during generation. This term introduces a bias change to the tooth surface with substantial small changes shown in both lengthwise and profile curvature.

Of course it is understood that various terms of the function may be used together to provide a desired tooth surface geometry, each term contributing to the desired effect. It is also understood that the particular value of each constant will influence the effect of the corresponding term on the desired tooth surface geometry. The particular constants will be calculated dependent upon the desired tooth surface.

Referring again to FIG. 15, a change effected substantially perpendicular to the instant line of relative rotation between the generating gear and work gear is shown by direction E and is known as a generating offset change. Until now, this change has been effected on the initial machine set-up, like a cone distance change, and remains constant during generation.

However, according to the present invention, the generating offset is not fixed, but rather, changes during the generation process according to a mathematical function, for example, as discussed above, a power series. In other words, the position of intersection of the generating gear axis and the pitch plane changes during generation along direction E. Unlike vertical motion, discussed in the "Background of the Invention" section, the present inventive motion does not emulate a large crown gear nor does it provide for the formation of low shaft angle gears. The present inventive motions are contemplated to introduce a controlled amount of mismatch or "fine-tune" tooth surface geometry.

The change in the generating offset distance may be expressed as:

$$DE = DE_0 + DE_1 \cdot \Delta q + DE_2 \cdot \Delta q^2 + \cdots$$

wherein:

DE = Total change in generating offset distance for a given generating gear displacement $\Delta q$, $DE_0$, $DE_1$, $DE_2$, ... = constants selected to control the exact relationship between the tool and work gear, and, $\Delta q$ = the displacement of the generating gear measured from a known position, generally the center of generating roll.

Figure 18:
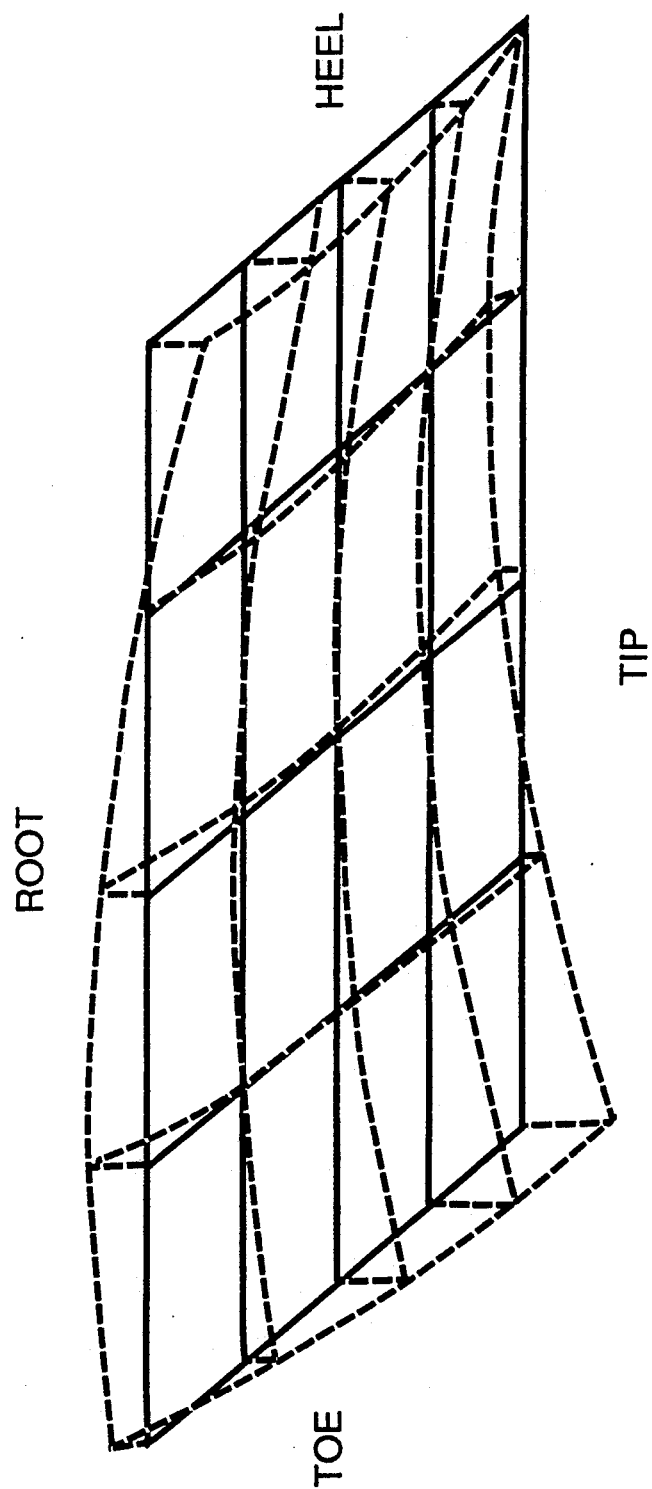
Figure 19:
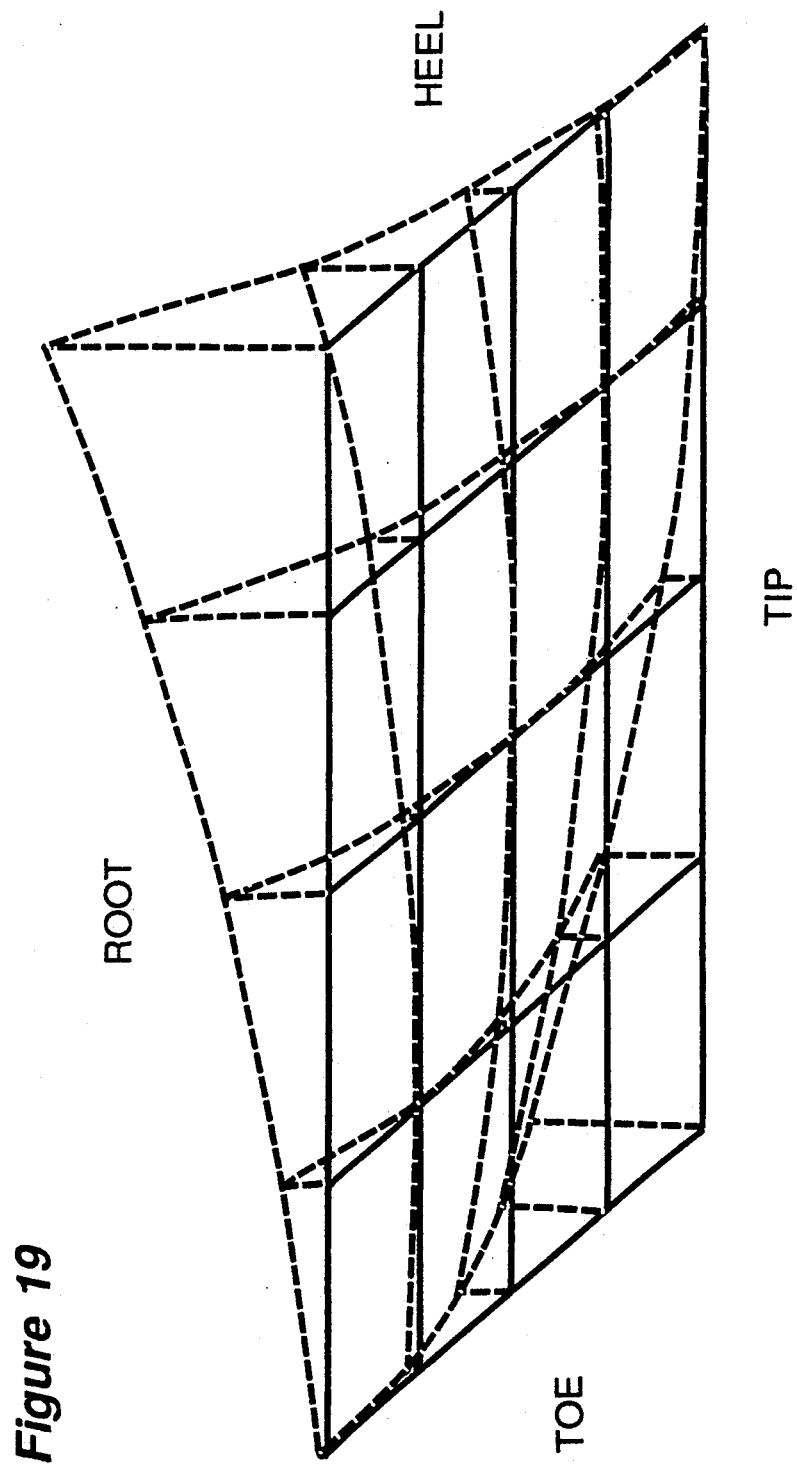

FIGS. 18 and 19 illustrate the effects of terms $DE_1$ and $DE_2$, respectively, in the above equation on the generated tooth surface. The term $DE_0$ denotes a known setup change with the results being small changes in both lengthwise and profile curvature. The "flat" surface in each Figure denotes the base surface which is a surface to which no modifications have been made. Again, the nominal spiral and pressure angles at the design point of the tooth and the root line are held constant as will be discussed further below.

FIG. 18 illustrates the effect of the motion component $DE_1$ which controls the velocity of the change in generating offset. The effects shown are changes to both the lengthwise and profile curvature in a concave/convex effect. That is, material may be removed along the profile of the tooth and left on along the length of the tooth. A small bias change is also noted.

FIG. 19 denotes the effect of the $DE_2$ motion component which controls the acceleration of the change in the generating offset. Significant changes in lengthwise and profile curvature as well as bias are shown.

As with the above-discussed cone distance change, it will be appreciated that the effects of the individual terms of the equation may be combined to produce any desired effect on the tooth surface. The value of each constant will influence the effect of the corresponding term to the desired tooth surface geometry. The value of a particular constant may be positive or negative which translates into additional metal being removed or left on a given tooth surface.

It may also be appreciated that the effects of the cone distance change DA and the generating offset distance DE may be combined. This provides movement of the position of intersection of the generating gear axis and the pitch plane relative to the work gear in a direction or directions other than parallel to or substantially perpendicular to the instant line of relative rotation. The invention is not limited to straight line movement of the intersection point of the generating gear axis and pitch plane. It is also contemplated that the direction of movement may be changed during the generating process. Motions DA and DE may be combined by any applicable method with the well known least squares method being a preferred procedure. As for each individual equation, the effect of each term in the combined equations contributes to the desired overall effect on the tooth surface geometry.

A second embodiment of the present invention will now be discussed. This embodiment is directed to a theoretical generating gear with teeth that change their orientation and position relative to the body of the theoretical generating gear which carries them.

Conventional generators emulate the geometry of a theoretical generating gear. The cradle of the generator can be thought of as the body of the theoretical generating gear. The tool is mounted on the cradle and its stock removing surfaces represent one or more teeth of the generating gear. To date, even on machines not physically employing a conventional cradle, such as that of previously discussed U.S. Pat. No. 4,981,402, the work gear and tool are oriented with respect to one another in the same manner as conventional machines. That is, generation takes place as though the work gear were in mesh with a theoretical generating gear with the tool representing the teeth of the theoretical generating gear.

Until now, all theoretical models for bevel and hypoid gear generation consider the teeth of the generating gear to have a fixed position relative to the body of the generating gear. In terms relating to conventional bevel gear generators, the position of the tool axis is fixed on the cradle, only allowing the tool the freedom to rotate about its own axis, and be carried in a circular arc path about the cradle center.

The present process comprises rotating a tool. The rotating tool and a work gear are then operatively engaged in a predetermined rolling motion about a theoretical axis of rotation wherein the theoretical axis represents the axis of rotation of a theoretical generating gear. The teeth of the theoretical generating gear, represented by the stock-removing surfaces of the tool, mesh with the work gear and thus form tooth surfaces of the work gear. Substantially simultaneously with the rolling motion, the orientation of the tooth surfaces of the theoretical generating gear is varied with respect to the body of the theoretical generating gear.

Figure 20:
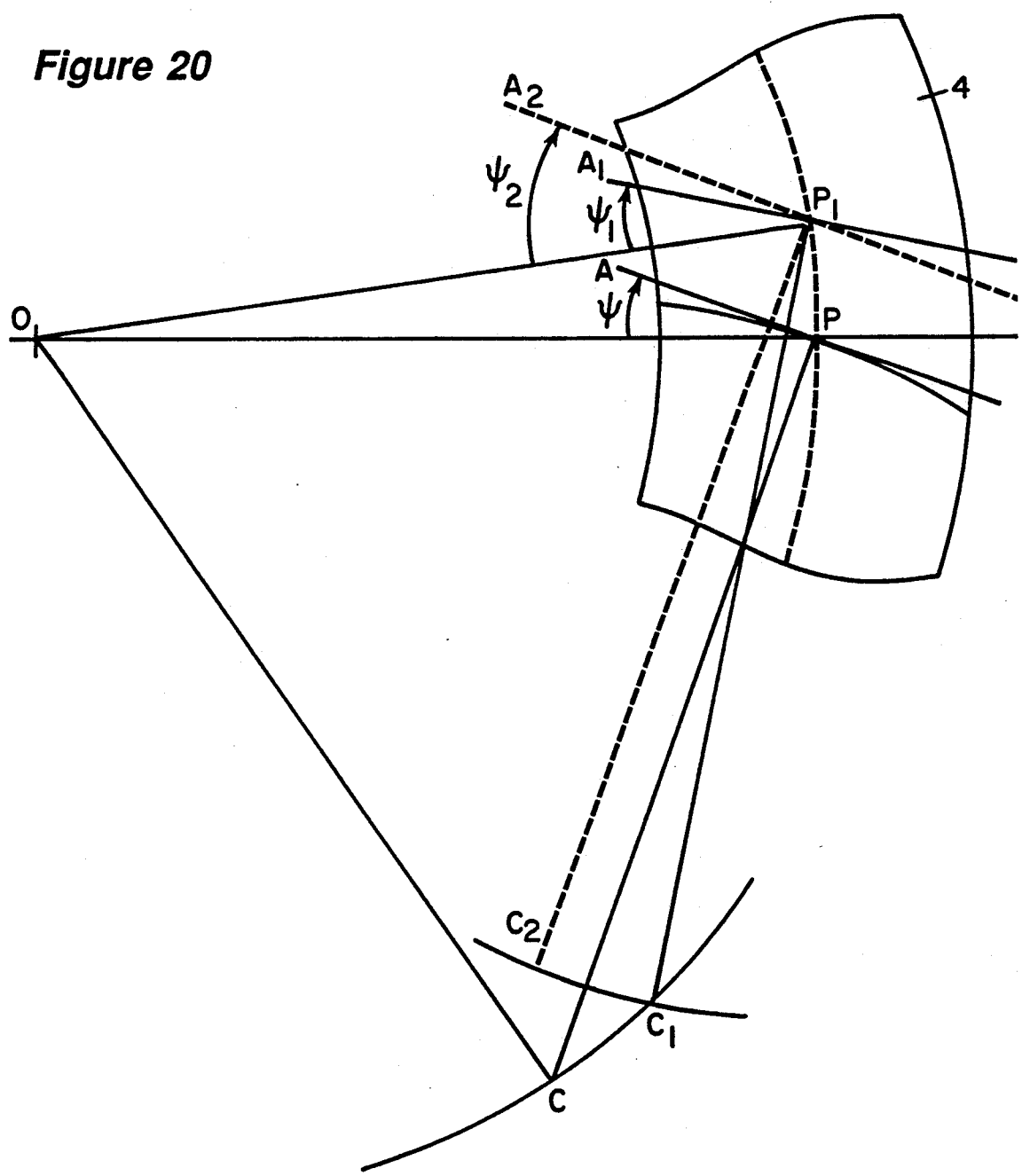
FIG. 20 schematically illustrates an inventive motion from a second embodiment of the present invention wherein the spiral angle of a tooth of a generating gear is changed during the generating process.

FIG. 20 depicts schematically one generating gear tooth geometry change motion. Typically, a tool with its center located at point C is mounted on a cradle, or generating gear, centered at point O. The tangent to the lengthwise tooth curve at design point P makes an angle, $\Psi$, with radial line OP. This is known as the nominal spiral angle. Conventionally, in the process of generation, the generating gear rotates about point O and thus the cutter is carried from point C to point $C_1$ in a circular path. Under such movements, the nominal spiral angle, $\Psi_1$, now measured as $OP_1A_1$, remains constant. That is, the orientation of the generating gear tooth remains the same.

However, according to one aspect of the second embodiment, during the process of generation, cutter center C is not only rotated to point $C_1$, but is also rotated about a point, for example, design point P, which is carried to point $P_1$. In this case, the final position of the cutter center would be $C_2$. The effect of this additional motion is that the nominal spiral angle, $\Psi_2$, measured $OP_1A_2$, is no longer equal to the original spiral angle, $\Psi$. Thus it may be said that this motion creates a generating gear with non-constant tooth geometry, that is, a nominal spiral angle which changes in the process of generation.

The nominal spiral angle of the theoretical generating gear tooth may vary during the generating process and the change may be represented mathematically by a function, a power series being preferred. The terms of the power series control the rate of change in the spiral angle of the generating gear.

The nominal spiral angle change may be expressed as:

$$D\Psi = D\Psi_1 * \Delta q + D\Psi_2 * \Delta q^2 + \ldots$$

wherein:

$D\Psi$ = the total change in the nominal spiral angle of the tooth surfaces of said theoretical generating gear for a given theoretical generating gear displacement $\Delta q$, $D\Psi_1$, $D\Psi_2$, ... = constants selected to control the exact relationship between the tool and work gear, and, $\Delta q$ = displacement of the generating gear measured from a known position.

Figure 21:
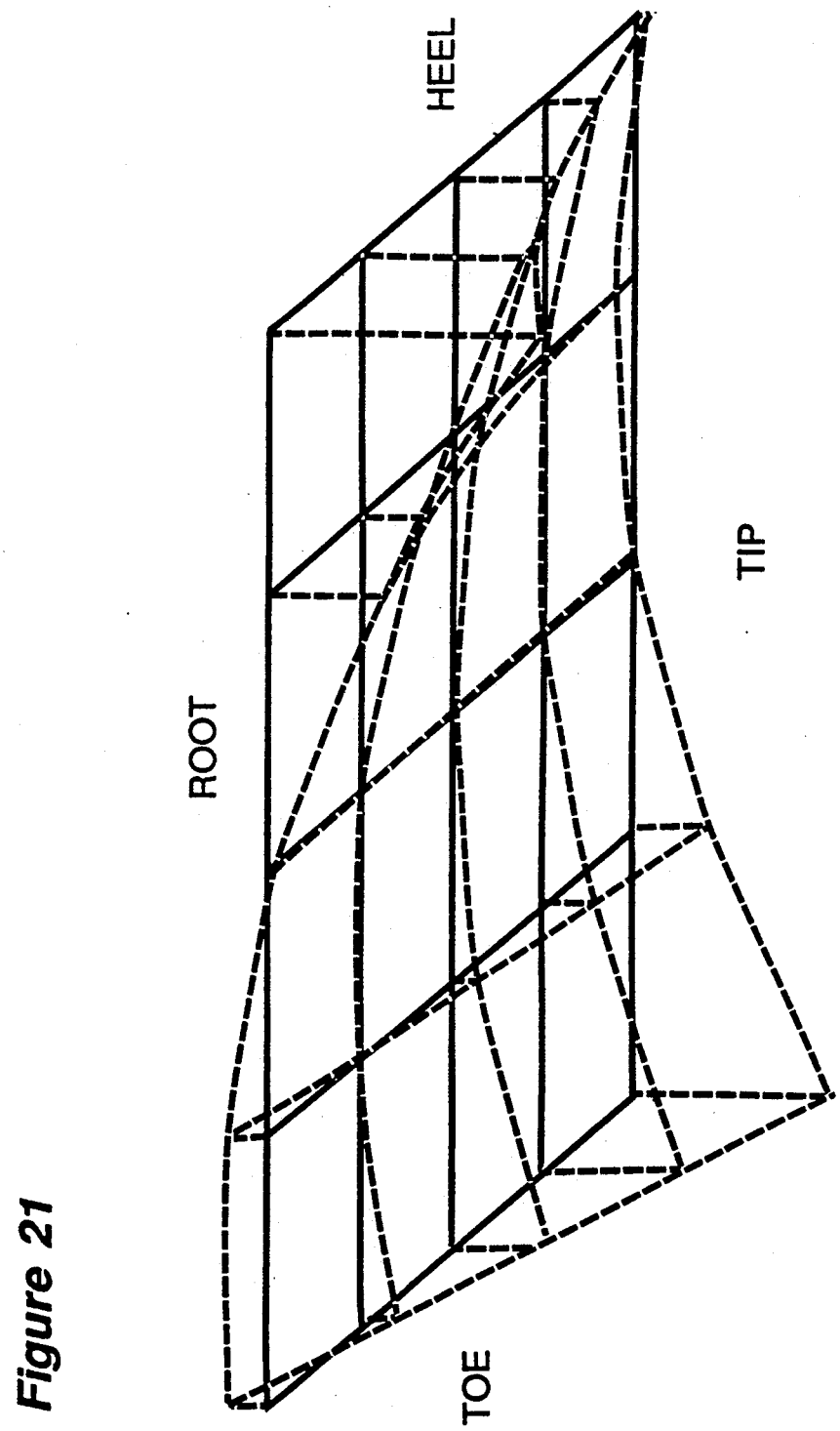
FIGS. 21 and 22 illustrate, respectively, the effects of nominal spiral angle change motion components, $D\Psi_1$ and $D\Psi_2$, on the surface of a work gear tooth.

FIG. 21 shows the effect of the motion component $D\Psi_1$ on the tooth surface geometry. The Figure shows that there is a significant change of lengthwise curvature and little change of profile curvature due to the effect of the $D\Psi_1$ term. It can also be seen that the pressure angle changes from the heel to the toe of the tooth.

Figure 22:
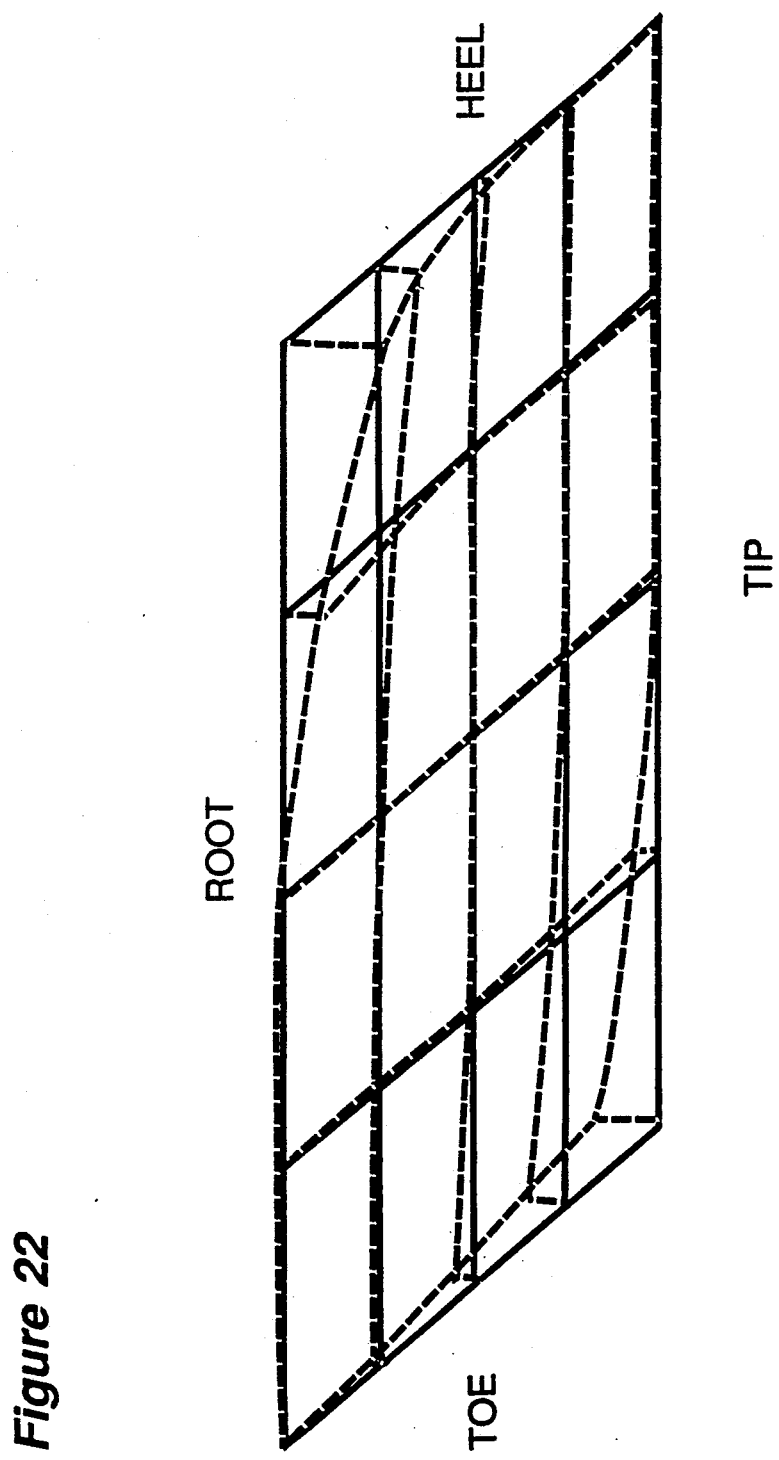

FIG. 22 shows the typical effects of motion component $D\Psi_2$. This motion has the effect of modifying the tooth surface with a third order surface change.

Figure 23:
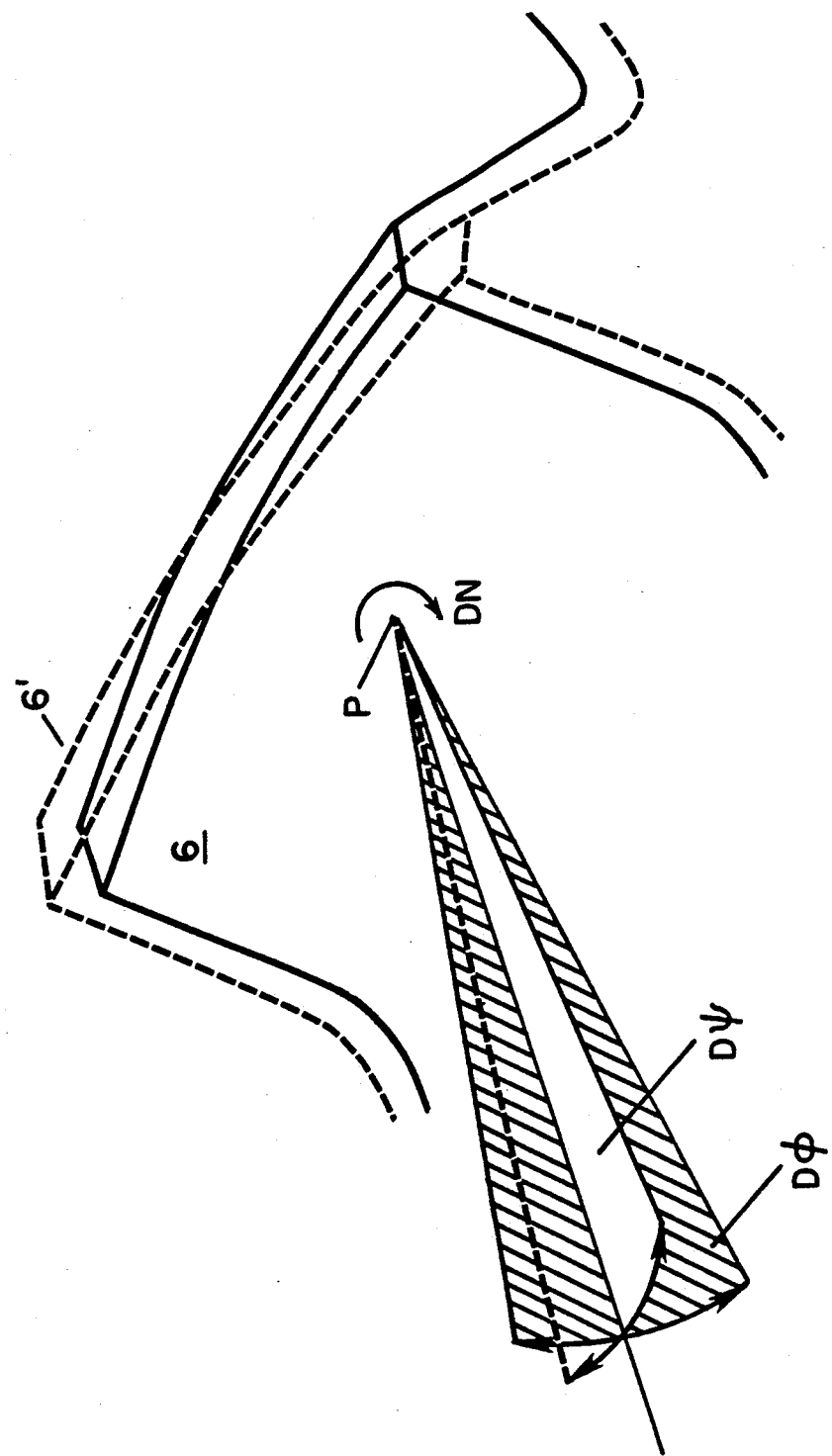
FIG. 23 illustrates the motions of the second embodiment wherein $D\Psi$ represents a change in nominal spiral angle, $D\phi$ represents a change in nominal pressure angle and DN represents a simultaneous or combined change in the lengthwise and profile geometry of a tooth of a generating gear.

Just as the nominal spiral angle of the generating gear can be changed during generation, the present invention contemplates changing the orientation and position of the generating gear teeth in other ways. FIG. 23 shows a tooth 6 of a generating gear with examples of three rotational motions superimposed on it. Rotation $D\Psi$ is the motion described above and has the effect of changing the nominal spiral angle of the generating gear tooth in the process of generation. Rotation $D\phi$ has the effect of changing the nominal pressure angle of the generating gear tooth during generation. Rotation DN is defined in a direction perpendicular to rotations $D\Psi$ and $D\phi$ and changes both the lengthwise and profile geometry of the generating gear tooth as shown by dashed lines 6'.

Similar to the nominal spiral angle change, both the nominal pressure angle change motion, $D\phi$, and the lengthwise and profile geometry change motion, DN, may be mathematically represented by a function. A preferred method also being a power series. The terms of the power series control the rate of change in the pressure angle and the lengthwise and profile geometry of the tooth surfaces of the generating gear.

The nominal pressure angle change may be expressed as follows:

$$D\phi = D\phi_1 * \Delta q + D\phi_2 * \Delta q^2 + ...$$

wherein:
$D\phi$ = the total change in nominal pressure angle of said tooth surfaces of said theoretical generating gear for a given theoretical generating gear displacement $\Delta q$, $D\phi_1$, $D\phi_2$, ... = constants selected to control the exact relationship between the tool and work gear, and, $\Delta q$ = displacement of the generating gear measured from a known position.

Figure 24:
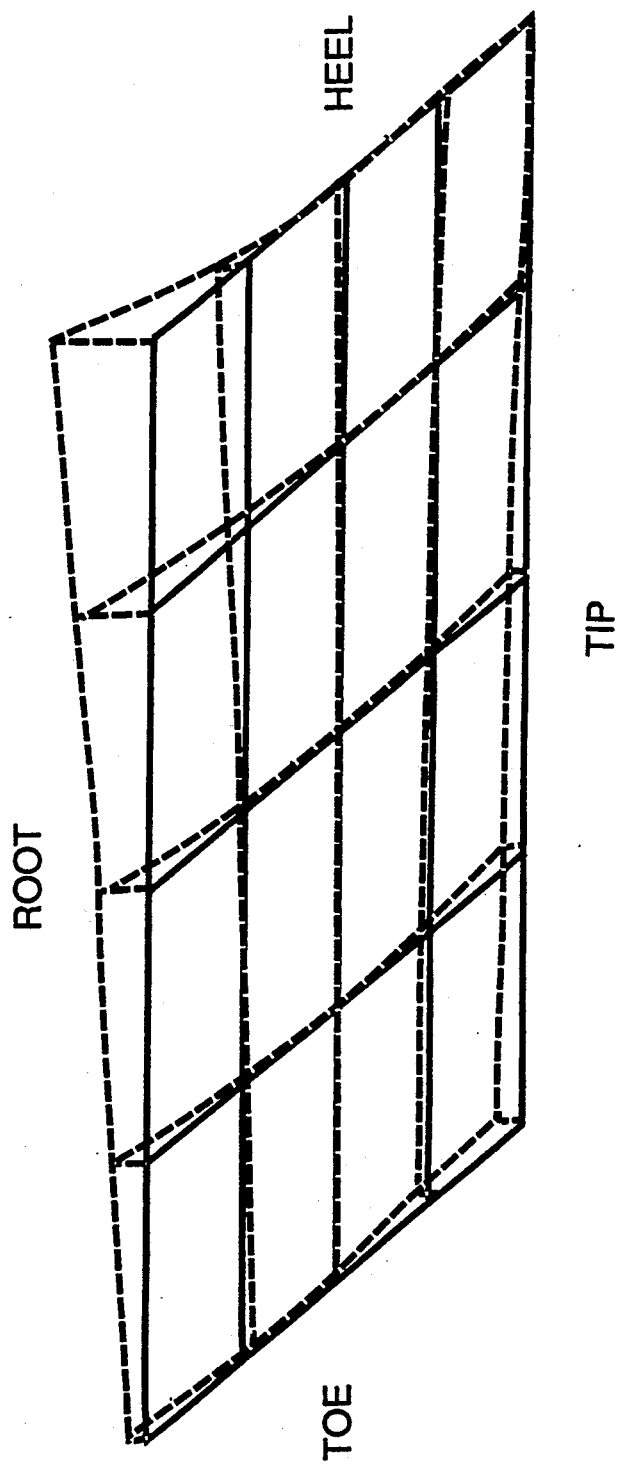
FIGS. 24 and 25 illustrate, respectively, the effects of nominal pressure angle change motion components, $D\phi_1$ and $D\phi_2$, on the surface of a work gear tooth.

FIG. 24 shows the general effect of the motion component $D\phi_1$ on tooth surface geometry. The surface may be characterized as a change in profile curvature along the length of the tooth. Such a motion, unavailable on conventional spiral bevel gear generators, enables one to simulate the effect of a curved profile tool while using a straight profile tool. This particular feature is beneficial when curved profile tooling is not available.

Figure 25:
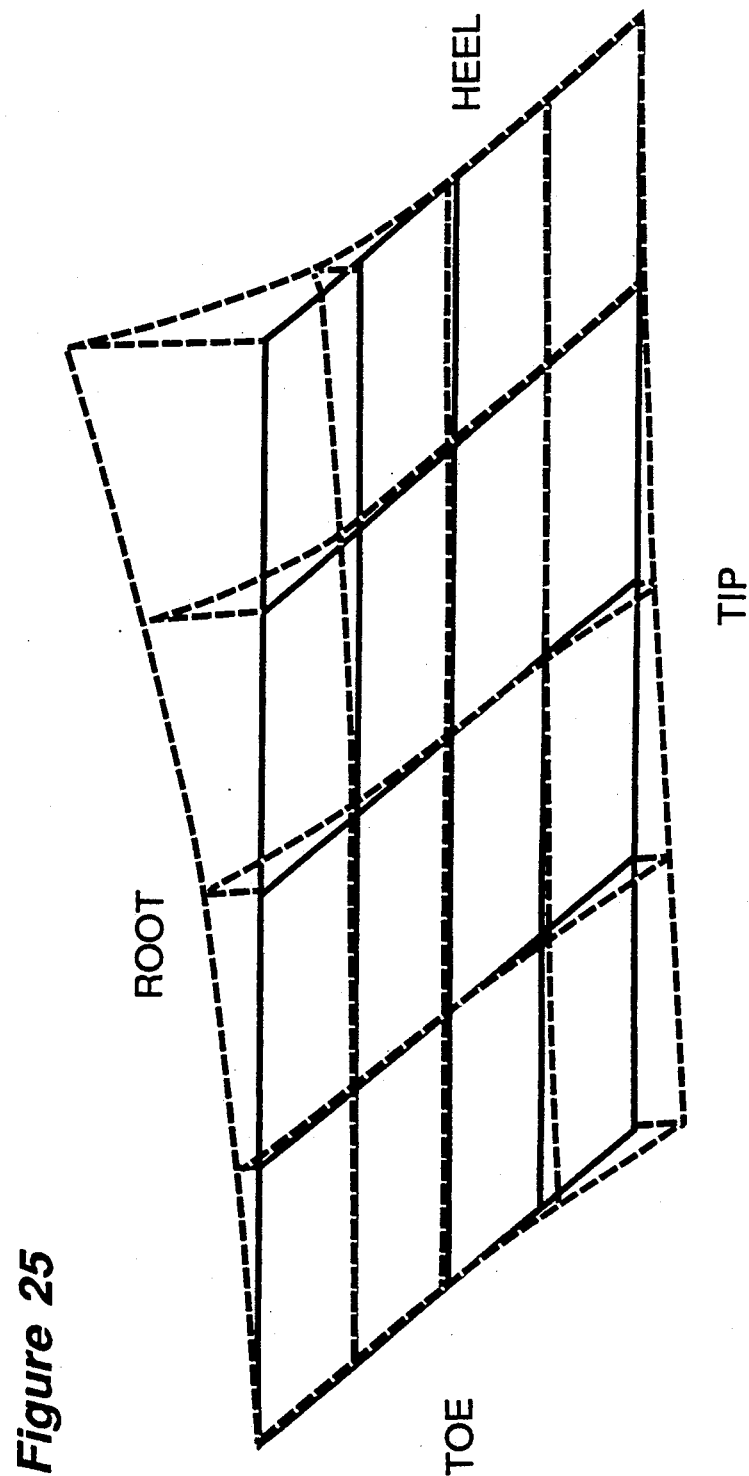

FIG. 25 shows the effect of motion component $D\phi_2$ on tooth surface geometry. The effect may be characterized as a third order change to the tooth surface in the profile direction. Such a surface change would be beneficial in eliminating undesirable third order surface characteristics which may occur as a result of conventional generating methods.

In a similar manner, the lengthwise and profile geometry change may also be expressed as follows:

$$DN = DN_1 * \Delta q + DN_2 * \Delta q^2 + ...$$

wherein:
DN = the total change in lengthwise and profile geometry of said tooth surfaces of said theoretical generating gear for a given theoretical generating gear displacement $\Delta q$, $DN_1$, $DN_2$, ... = constants selected to control the exact relationship between the tool and work gear, and, $\Delta q$ = displacement of the generating gear measured from a known position.

Figure 26:
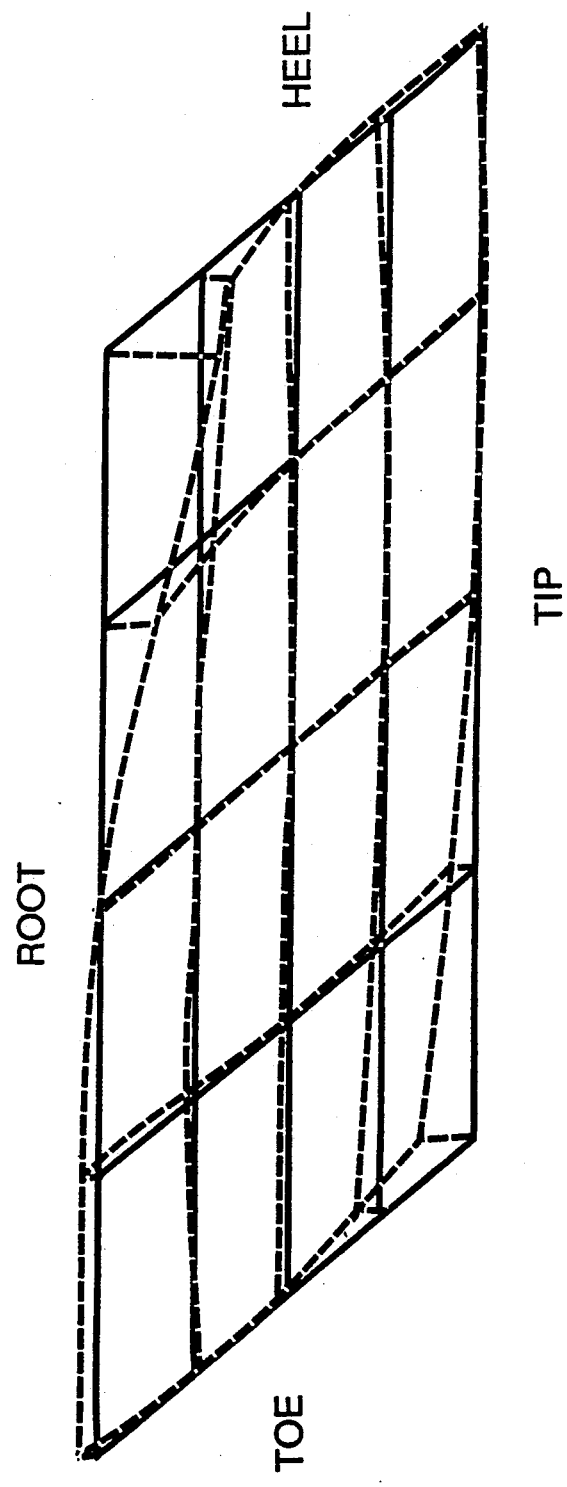
FIGS. 26 and 27 illustrate, respectively, the effects of lengthwise and profile change motion components, $DN_1$ and $DN_2$, on the surface of a work gear tooth.

The effect of the motion component $DN_1$ is shown by FIG. 26. This motion component produces changes in the profile curvature from the heel to the toe of the tooth as well as a change to the lengthwise curvature from the top to the flank of the tooth. Both of these changes are third order changes to the tooth surface and are difficult to effect by any other methods.

Figure 27:
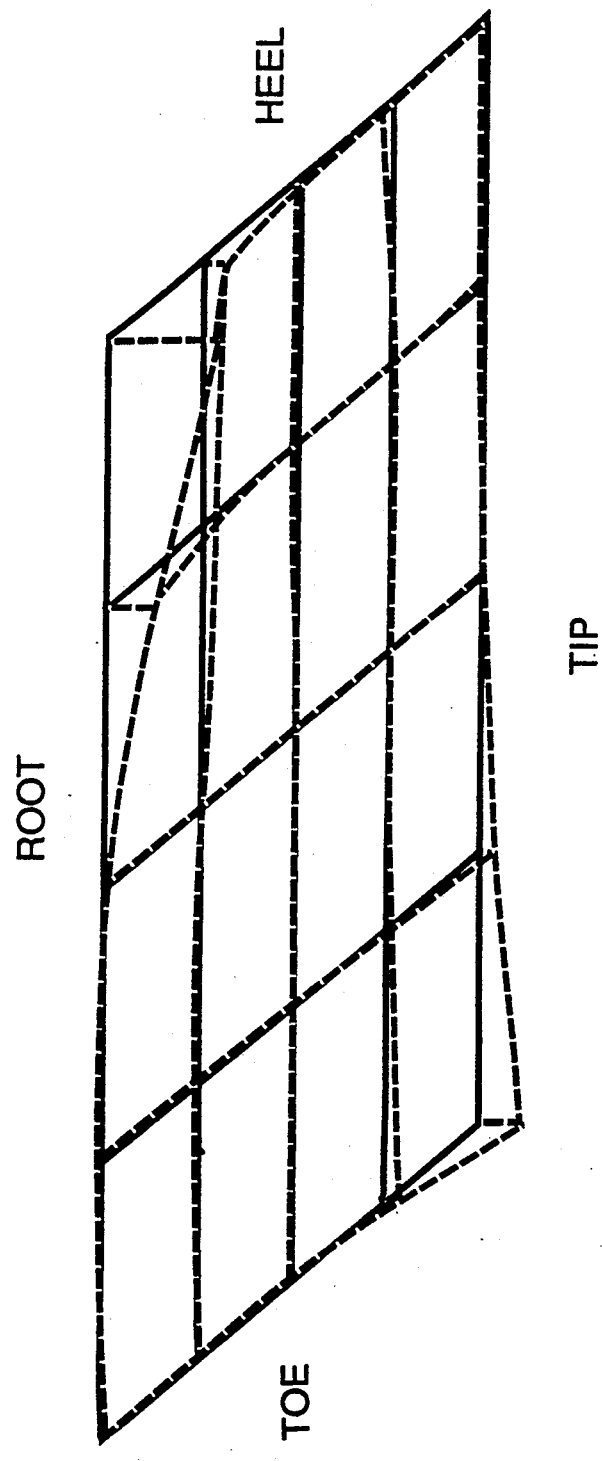

FIG. 27 shows the effect of motion component $DN_2$ on the tooth surface geometry. It can be seen that a fourth order surface change is effected. Such a change leaves most of the tooth surface unaltered with mismatch found only at the extremities of the tooth. This effect is beneficial in that it helps keep gear tooth contact from running off the tooth under load.

It is noted that the above three equations representing rotational motions of a generating gear tooth do not contain zero subscript terms, that is $D\Psi_0$, $D\phi_0$ and $DN_0$. These terms represent fixed changes to the spiral angle and pressure angle. Including these terms in the above equations would result in a change to the initial machine settings thus producing a gear having incorrect spiral and pressure angles.

The above equations leave open the possibility of defining the inventive motions, DA, DE, $D\Psi$, $D\phi$ and DN, with coefficients multiplied by $\Delta q$ raised to yet higher powers. Such higher order motion components are contemplated in the context of the present invention, and their effects on the tooth surface geometry move away from the design point as the order of each term increases.

Figure 28:
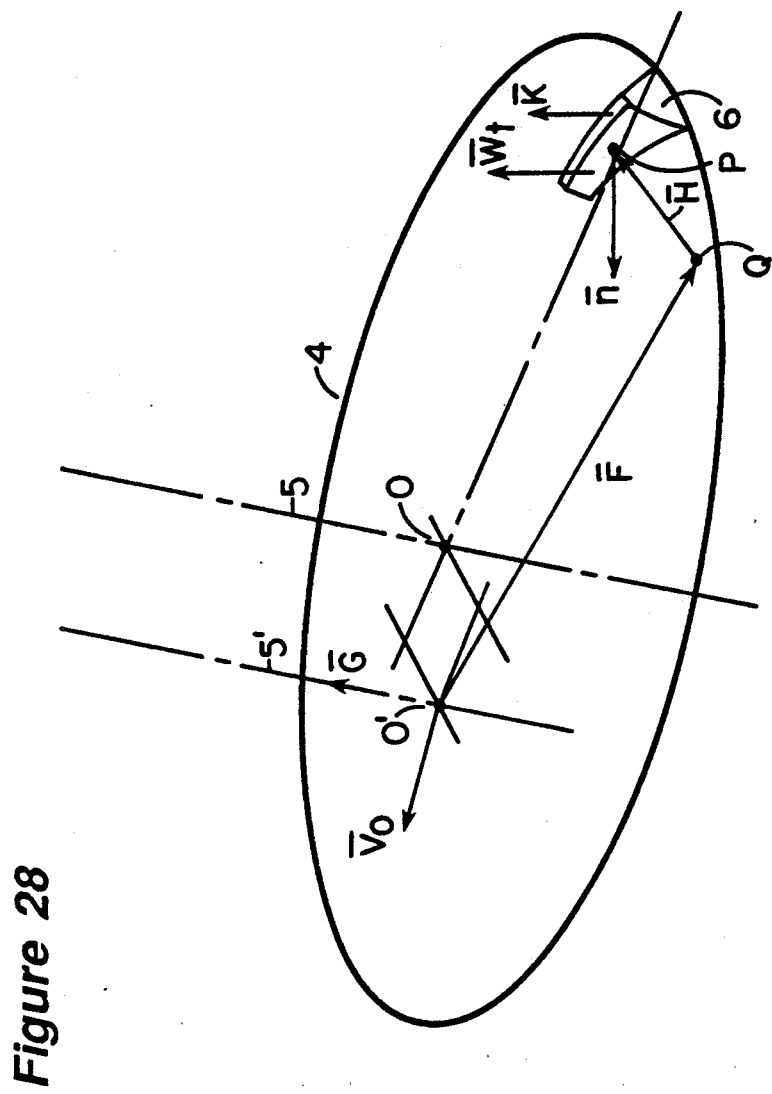
FIG. 28 schematically illustrates a theoretical generating gear and one tooth on the generating gear.

The generating gear tooth rotations described above can be combined to have a composite effect. It can be seen that any possible rotation of the tooth can be expressed as a sum of the motions $D\Psi$, $D\phi$ and DN. These motions represent all rotational degrees of freedom. It is believed that the choice of component rotations, that is, the directions about which the component rotations are defined, enables the effects of the motions to be more clearly understood and estimated. However, the invention is not limited to these particular rotation components but contemplates any rotation components which represent all rotational degrees of freedom of a generating gear tooth. Also, the location of point Q, which is the point on the generating gear about which tooth 6 rotates, may be chosen freely. FIG. 23 shows points P and Q coinciding, whereas FIG. 28 shows them at distinct points in space.

Just as with motions DA and DE, it is desirable to hold the nominal spiral angle and pressure angle to a specified value at the design point of the generating gear tooth and it may also be desirable to maintain the root line constant along the tooth length for motions DΨ, Dφ and DN.

Whereas all the magnitudes of the above described motion components, both linear and angular, can be chosen at will, taken alone they may cause unacceptable changes to the generated tooth surface. Specifically, additional motions may cause "first-order" surface changes, that is, changes to the nominal spiral angle and nominal pressure angle, and changes to the "root-line", that is, the depth to which the tooth is cut, measured along the tooth.

The above deficiencies may be corrected by further modifying the motion of the generating gear. The desired corrections may be accomplished by the addition of two motion components: (1) helical motion, and (2) the ratio-of-roll. Both terms have been defined above. It is noted that all surface topology diagrams discussed and illustrated in the drawings represent the effects of the inventive motion changes combined with these corrective motions.

The determination of the magnitude of the corrective motions will now be discussed with reference to FIG. 28 which shows, schematically, the body of a theoretical generating gear 4, generating gear axis 5 and one tooth 6 on the body of the generating gear. The following features are defined:

Point O - The nominal center of the generating gear,
Point O' - The new center of the generating gear and axis, 5', due to displacements DA and DE,
Point Q - The point on the generating gear about which tooth 6 rotates,
Point P - The design point on tooth 6,
Vector G - Lies along the axis of the generating gear, also represents the angular velocity of the body of y the generating gear,
Vector F - From point O' to point Q,
Vector H - From point Q to point P,
Vector $V_o$ - The linear velocity of the center of the generating gear, due to the motion components $DA_1$ and $DE_1$, scaled to vector G,
Vector $W_t$ - The angular velocity of tooth 6 relative to the body of the generating gear, scaled to vector G,
Vector K - Normal to the topland of tooth 6 of the generating gear.
Vector n - The projection of the tooth normal at design point P onto the pitch plane.
Vector n is unit length.

The two motion components which correct for first order and hold proper root line are represented as follows:

$$L = \frac{-(\overline{G} \times \overline{F} + \overline{W}_t \times \overline{H} + \overline{V}_o) \cdot \overline{K}}{(\overline{G} \cdot \overline{K})}$$

wherein:
L represents the amount of linear translation along vector G, helical motion, per unit rotation of the crown gear about axis 5', and, $$M = \frac{-(\overline{G} \times \overline{F} + \overline{W}_t \times \overline{H} + \overline{LG} + \overline{V}_o) \cdot \overline{n}}{A\cos\Psi}$$

wherein:
M represents a coefficient which, when multiplied by the nominal ratio-of-roll, for a desired job, will yield a ratio-of-roll which will hold first order surface characteristics,
A = nominal cone distance of the generating gear, and,
Ψ = nominal spiral angle of the generating gear.

Bevel gears may be manufactured by forming opposite sides of a gear tooth during either simultaneous or separate machining operations. Methods which form both tooth flanks simultaneously are sometimes referred to as "duplex" methods, while those calling for separate operations are called "single-side" methods.

When determining a machine set-up to cut a given gear, it is of primary importance that the set-up yield two characteristics vital to the gear's ability to mesh with its mate. They are spiral angle and pressure angle, also referred to as "first order surface characteristics".

Single-side methods require that these characteristics be held only for the side of the tooth being generated. On the other hand, duplex methods require that first order characteristics be held on both sides of the tooth simultaneously. A wide range of methods for designing gears and calculating machine settings are known for both single-side and duplex methods. The disclosed method for determining corrective generating motions satisfies first-order characteristics for one side of a tooth. However, it is well within the purview of the skilled artisan to extend the method to compensate for both sides of a tooth.

The rotational motions of the generating gear teeth may also be combined with the linear motions of the generating gear axis, discussed above, to enable any desired surface to be formed on the teeth of a work gear. The well known least squares method is a preferred method of combining the component motions of the present invention.

It is to be understood that the inventive motions may be superimposed and/or combined with previously known modified generating motions and machine set-ups. For instance, the inventive rotational motions of the generating gear teeth may be effected whether or not the tool axis is perpendicular to the pitch plane of the generating gear, that is, perpendicular to the plane of the paper in FIG. 20.

It is to be further understood that the inventive motions discussed above are applicable to, but not limited to, generating processes of both the face milling and face hobbing types.

The present invention enables the formation of desired tooth surface geometries heretofore unobtainable by conventional generating motions. Because of the wide range of gearing applications, and thus, tooth surface requirements, the ability of the inventive motions of the present invention to match a desired tooth surface geometry is of the utmost importance.

While the inventive process has been described with reference to preferred embodiments it is to be understood that the invention is not limited to the particulars thereof. The present invention is intended to include modifications which would be apparent to those skilled in the art to which the subject matter pertains without deviating from the scope and spirit of the appended claims.

What is claimed is:
1. In a method of generating bevel and hypoid gears comprising the steps of:
rotating a tool, and
operatively engaging said tool with a work gear in a predetermined rolling motion about a theoretical axis of rotation wherein said theoretical axis represents the axis of rotation of a theoretical generating gear and wherein said theoretical axis intersects the pitch plane of said work gear and said theoretical generating gear, said theoretical generating gear rolling in mesh with said work gear and having tooth surfaces represented by the stock removing surfaces of said tool, the improvement comprising the step of, substantially simultaneously with said rolling motion, varying at least the position of intersection of said theoretical axis and said pitch plane relative to said work gear.

2. The method of claim 1 wherein said method is computer numerically controlled.

3. The method of claim 1 wherein said varying comprises varying said position of intersection in a direction A substantially parallel to the instant line of rotation between said work gear and said generating gear.

4. The method of claim 3 wherein said varying in a direction A is represented by a mathematical function.

5. The method of claim 4 wherein said mathematical function is expressed as a power series.

6. The method of claim 5 wherein said power series is expressed as:

$$DA = DA_0 + DA_1 {}^*\Delta q + DA_2 {}^*\Delta q^2 + \ldots$$

wherein:
  $DA$ = the total change in generating cone distance for a given generating gear displacement $\Delta q$,
  $DA_0, DA_1, DA_2, \ldots$ = constants selected to control the exact relationship between the tool and work gear, and,
  $\Delta q$ = the displacement of the generating gear measured from a known position.

7. The method of claim 1 wherein said varying comprises varying said position of intersection in a direction E substantially perpendicular to the instant line of rotation between said work gear and said generating gear.

8. The method of claim 7 wherein said varying in a direction E is represented by a mathematical function.

9. The method of claim 8 wherein said mathematical function is expressed as a power series.

10. The method of claim 9 wherein said power series is expressed as:

$$DE = DE_0 + DE_1 {}^*\Delta q + DE_2 {}^*\Delta q^2 + \ldots$$

wherein:
  $DE$ = the total change in generating offset for a given generating gear displacement $\Delta q$,
  $DE_0, DE_1, DE_2, \ldots$ = constants selected to control the exact relationship between the tool and work gear, and,
  $\Delta q$ = displacement of the generating gear measured from a known position.

11. The method of claim 1 wherein said generating comprises face milling.

12. The method of claim 1 wherein said generating comprises face hobbing.

13. In a method of generating bevel and hypoid gears comprising the steps of:
  rotating a tool, and
  operatively engaging said tool with a work gear in a predetermined rolling motion about a theoretical axis of rotation wherein said theoretical axis represents the axis of rotation of a theoretical generating gear, said theoretical generating gear rolling in mesh with said work gear and having tooth surfaces represented by the stock removing surfaces of said tool, the improvement comprising the step of, substantially simultaneously with said rolling motion, varying the orientation of said tooth surfaces of said theoretical generating gear with respect to the body of said theoretical generating gear.

14. The method of claim 13 wherein said method is computer numerically controlled.

15. The method of claim 13 wherein said varying comprises varying the nominal spiral angle, nominal pressure angle, lengthwise and profile geometry, or combinations thereof, of said tooth surfaces of said generating gear.

16. The method of claim 13 wherein said varying comprises varying at least the nominal spiral angle of said tooth surfaces of said theoretical generating gear.

17. The method of claim 16 wherein said varying is represented by a mathematical function.

18. The method of claim 17 wherein said mathematical function is expressed as a power series.

19. The method of claim 18 wherein said power series is expressed as:

$$D\Psi = D\Psi_1 {}^*\Delta q + D\Psi_2 {}^*\Delta q^2 + \ldots$$

wherein:
  $D\Psi$ = the total change in the nominal spiral angle of the tooth surfaces of said theoretical generating gear for a given theoretical generating gear displacement $\Delta q$,
  $D\Psi_1, D\Psi_2, \ldots$ = constants selected to control the exact relationship between the tool and work gear, and,
  $\Delta q$ = displacement of the generating gear measured from a known position.

20. The method of claim 13 wherein said varying comprises varying at least the nominal pressure angle of said tooth surfaces of said theoretical generating gear.

21. The method of claim 20 wherein said varying is represented by a mathematical function.

22. The method of claim 21 wherein said mathematical function is expressed as a power series.

23. The method of claim 22 wherein said power series is expressed as:

$$D\phi = D\phi_1 {}^*\Delta q + D\phi_2 {}^*\Delta q^2 + \ldots$$

wherein:
  $D\Psi$ = the total change in nominal pressure angle of said tooth surfaces of said theoretical generating gear for a given theoretical generating gear displacement $\Delta q$,
  $D\phi_1, D\phi_2, \ldots$ = constants selected to control the exact relationship between the tool and work gear, and,
  $\Delta q$ = displacement of the generating gear measured from a known position.

24. The method of claim 13 wherein said varying comprises varying at least the lengthwise and profile geometry of said tooth surfaces of said theoretical generating gear.

25. The method of claim 24 wherein said varying is represented by a mathematical function.

26. The method of claim 25 wherein said mathematical function is expressed as a power series.

27. The method of claim 26 wherein said power series is expressed as:

$$DN = DN_1 * \Delta q + DN_2 * \Delta q^2 + \ldots$$

wherein:
DN = the total change in lengthwise and profile geometry of said tooth surfaces of said theoretical generating gear for a given theoretical generating gear displacement $\Delta q$,
$DN_1, DN_2, \ldots$ = constants selected to control the exact relationship between the tool and work gear, and,
$\Delta q$ = displacement of the generating gear measured from a known position.

28. The method of claim 13 wherein said generating comprises face milling.

29. The method of claim 13 wherein said generating comprises face hobbing.

30. In a method of generating bevel and hypoid gears comprising the steps of:
rotating a tool, and
operatively engaging said tool with a work gear in a predetermined rolling motion about a theoretical axis of rotation wherein said theoretical axis represents the axis of rotation of a theoretical generating gear and wherein said theoretical axis intersects the pitch plane of said work gear and said theoretical generating gear, said theoretical generating gear rolling in mesh with said work gear and having tooth surfaces represented by the stock removing surfaces of said tool, the improvement comprising the step of,
including additional motion substantially simultaneously with said rolling motion, said additional motion being at least one of (a) varying the position of intersection of said theoretical axis and said pitch plane relative to said work gear and (b) varying the orientation of said tooth surfaces of said theoretical generating gear with respect to the body of said generating gear.

31. The method of claim 30 wherein said method is computer numerically controlled.

32. The method of claim 30 wherein said varying comprises varying said position of intersection in a direction A substantially parallel to the instant line of rotation between said work gear and said generating gear.

33. The method of claim 30 wherein said varying comprises varying said position of intersection in a direction E substantially perpendicular to the instant line of rotation between said work gear and said generating gear.

34. The method of claim 30 wherein said varying the orientation comprises varying the nominal spiral angle, nominal pressure angle, lengthwise and profile geometry, or combinations thereof, of said tooth surfaces of said theoretical generating gear.

35. The method of claim 30 wherein said generating comprises face milling.

36. The method of claim 30 wherein said generating comprises face hobbing.

37. A method of generating longitudinally curved tooth spaces in bevel and hypoid gears with a computer controlled machine, said machine having a plurality of computer controlled axes for positioning and operatively engaging a tool with a work gear, said method comprising the steps of:
computing initial setup positions in response to setup parameters input to said machine,
moving said computer controlled axes to said initial setup positions for initially positioning said tool and work gear with respect to each other,
computing further operating positions of said axes in response to operating parameters input to said machine,
moving said computer controlled axes to said further operating positions for operatively engaging said tool and said work gear in a manner to impart a predetermined relative rolling motion between said tool and said work gear as though said work gear were rolling in mesh with a theoretical generating gear having tooth surfaces represented by the stock removing surfaces of said tool, said theoretical generating gear having an axis of rotation with said axis of rotation intersecting the pitch plane of said work gear and said theoretical generating gear,
wherein said moving to said further operating positions includes, substantially simultaneously with said rolling motion, at least one of moving said computer controlled axes (a) to vary the position of intersection of said theoretical axis and said pitch plane relative to said work gear and (b) to vary the orientation of said tooth surfaces of said theoretical generating gear with respect to the body of said generating gear, and,
repeating said steps of computing further operating positions and moving said computer controlled axes to said further operating positions for completing the generating operation.

38. The method of claim 37 wherein said computer controlled axes are computer numerically controlled.

39. The method of claim 37 wherein said vary the position of intersection comprises varying the position of intersection in a direction A substantially parallel to the instant line of rotation between said work gear and said generating gear.

40. The method of claim 37 wherein said vary the position of intersection comprises varying the position of intersection in a direction E substantially perpendicular to the instant line of rotation between said work gear and said generating gear.

41. The method of claim 37 wherein said vary the orientation comprises varying the nominal spiral angle, nominal pressure angle, lengthwise and profile geometry, or combinations thereof, of said tooth surfaces of said theoretical generating gear.

42. The method of claim 37 wherein said generating comprises face milling.

43. The method of claim 37 wherein said generating comprises face hobbing.

* * * * *